United States Patent
Lakshman et al.

(10) Patent No.: US 11,314,458 B2
(45) Date of Patent: *Apr. 26, 2022

(54) GLOBAL DE-DUPLICATION OF VIRTUAL DISKS IN A STORAGE PLATFORM

(71) Applicant: Commvault Systems, Inc., Tinton Falls, NJ (US)

(72) Inventors: Avinash Lakshman, Fremont, CA (US); Gaurav Yadav, Mountain View, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,164

(22) Filed: Sep. 22, 2020

(65) Prior Publication Data

US 2021/0004181 A1 Jan. 7, 2021

Related U.S. Application Data

(63) Continuation of application No. 15/155,838, filed on May 16, 2016, now Pat. No. 10,846,024.

(51) Int. Cl.
*G06F 3/06* (2006.01)

(52) U.S. Cl.
CPC .......... *G06F 3/0664* (2013.01); *G06F 3/0608* (2013.01); *G06F 3/0641* (2013.01); *G06F 3/0683* (2013.01)

(58) Field of Classification Search
CPC .... G06F 3/0664; G06F 3/0608; G06F 3/0641; G06F 3/0683
See application file for complete search history.

(56) References Cited

U.S. PATENT DOCUMENTS

| 5,499,367 A | 3/1996 | Bamford et al. |
| 5,559,991 A | 9/1996 | Kanfi |

(Continued)

FOREIGN PATENT DOCUMENTS

| WO | WO 2006/052872 | 5/2006 |
| WO | WO 2010/013292 A1 | 2/2010 |

(Continued)

OTHER PUBLICATIONS

Final Office Action dated Aug. 7, 2019 for U.S. Appl. No. 15/155,838.

(Continued)

*Primary Examiner* — Eric Cardwell
(74) *Attorney, Agent, or Firm* — Knobbe, Martens, Olson & Bear, LLP

(57) ABSTRACT

In order to avoid writing duplicates of blocks of data into a storage platform, any virtual disk within the storage platform may have a de-duplication feature enabled. Or, all virtual disks have this feature enabled. For virtual disks with de-duplication enabled, a unique message digest is calculated for every block of data written to that virtual disk. Upon a write, these message digests are consulted in order to determine if a particular block of data has already been written, if so, it is not written again, and if not, it is written. All de-duplication virtual disks are written to a single system virtual disk within the storage platform. De-duplication occurs over the entire storage platform and over all its virtual disks because all message digests are consulted before a write is performed for any virtual disk. A read for a de-duplication virtual desk reads from the system virtual disk.

20 Claims, 13 Drawing Sheets

(56) References Cited

U.S. PATENT DOCUMENTS

| | | |
|---|---|---|
| 5,625,793 A | 4/1997 | Mirza |
| 5,642,496 A | 6/1997 | Kanfi |
| 5,732,240 A | 3/1998 | Caccavale |
| 5,765,173 A | 6/1998 | Cane et al. |
| 6,286,084 B1 | 9/2001 | Wexler et al. |
| 6,418,478 B1 | 7/2002 | Ignatius et al. |
| 6,425,057 B1 | 7/2002 | Cherkasova et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 6,760,812 B1 | 7/2004 | Degenaro et al. |
| 6,823,377 B1 | 11/2004 | Wu et al. |
| 7,003,641 B2 | 2/2006 | Prahlad et al. |
| 7,028,096 B1 | 4/2006 | Lee |
| 7,035,880 B1 | 4/2006 | Crescenti et al. |
| 7,103,617 B2 | 9/2006 | Phatak |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,237,061 B1 | 6/2007 | Boic |
| 7,246,207 B2 | 7/2007 | Kottomtharayil et al. |
| 7,284,030 B2 | 10/2007 | Ackaouy et al. |
| 7,315,923 B2 | 1/2008 | Retnamma et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,472,238 B1 | 12/2008 | Gokhale et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,539,710 B1 | 5/2009 | Haustein et al. |
| 7,543,125 B2 | 6/2009 | Gokhale |
| 7,546,324 B2 | 6/2009 | Prahlad et al. |
| 7,574,692 B2 | 8/2009 | Herscu |
| 7,584,338 B1 | 9/2009 | Bricker et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Prahlad et al. |
| 7,720,841 B2 | 5/2010 | Gu et al. |
| 7,734,820 B1 | 6/2010 | Ranade et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 7,814,149 B1 | 10/2010 | Stringham |
| 7,822,939 B1 | 10/2010 | Veprinsky et al. |
| 8,145,614 B1 | 3/2012 | Zimran et al. |
| 8,204,862 B1 | 6/2012 | Paulzagade et al. |
| 8,209,334 B1 | 6/2012 | Doerner |
| 8,364,652 B2 | 1/2013 | Vijayan et al. |
| 8,370,542 B2 | 2/2013 | Lu et al. |
| 8,484,162 B2 | 7/2013 | Prahlad et al. |
| 8,549,350 B1 | 10/2013 | Dutch et al. |
| 8,572,340 B2 | 10/2013 | Vijayan et al. |
| 8,577,851 B2 | 11/2013 | Vijayan et al. |
| 8,578,109 B2 | 11/2013 | Vijayan et al. |
| 8,732,133 B2 | 5/2014 | Attarde |
| 8,930,306 B1 | 1/2015 | Ngo et al. |
| 8,938,481 B2 | 1/2015 | Kumarasamy et al. |
| 8,954,446 B2 | 2/2015 | Vijayan Retnamma et al. |
| 9,020,900 B2 | 4/2015 | Vijayan Retnamma et al. |
| 9,021,198 B1 | 4/2015 | Vijayan |
| 9,104,623 B2 | 8/2015 | Retnamma et al. |
| 9,116,850 B2 | 8/2015 | Vijayan Retnamma et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,251,186 B2 | 2/2016 | Muller et al. |
| 9,275,086 B2 | 3/2016 | Kumarasamy |
| 9,298,715 B2 | 3/2016 | Kumarasamy et al. |
| 9,298,723 B1 | 3/2016 | Vincent |
| 9,342,253 B1 | 5/2016 | Muthukkaruppan et al. |
| 9,342,537 B2 | 5/2016 | Kumarasamy et al. |
| 9,405,482 B2 | 8/2016 | Varadharajan |
| 9,411,534 B2 | 8/2016 | Lakshman |
| 9,424,058 B1 | 8/2016 | Wasson et al. |
| 9,424,151 B2 | 8/2016 | Lakshman |
| 9,483,205 B2 | 11/2016 | Lakshman |
| 9,558,085 B2 | 1/2017 | Lakshman |
| 9,575,673 B2 | 2/2017 | Mitkar et al. |
| 9,633,033 B2 | 4/2017 | Vijayan et al. |
| 9,633,056 B2 | 4/2017 | Attarde et al. |
| 9,639,274 B2 | 5/2017 | Maranna |
| 9,665,591 B2 | 5/2017 | Vijayan et al. |
| 9,753,955 B2 | 9/2017 | Agrawal |
| 9,798,489 B2 | 10/2017 | Lakshman |
| 9,848,046 B2 | 12/2017 | Mehta |
| 9,864,530 B2 | 1/2018 | Lakshman |
| 9,875,063 B2 | 1/2018 | Lakshman |
| 10,061,663 B2 | 8/2018 | Vijayan et al. |
| 10,067,722 B2 | 9/2018 | Lakshman |
| 10,126,973 B2 | 11/2018 | Vijayan et al. |
| 10,223,211 B2 | 3/2019 | Kumarasamy |
| 10,223,212 B2 | 3/2019 | Kumarasamy |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,380,072 B2 | 8/2019 | Attarde et al. |
| 10,795,577 B2 | 10/2020 | Lakshman et al. |
| 2001/0052015 A1 | 12/2001 | Lin et al. |
| 2002/0062439 A1 | 5/2002 | Cotugno et al. |
| 2002/0143892 A1 | 10/2002 | Mogul |
| 2003/0115346 A1 | 6/2003 | McHenry et al. |
| 2003/0174648 A1 | 9/2003 | Wang et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0098373 A1 | 5/2004 | Bayliss et al. |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0117558 A1 | 6/2005 | Angermann et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0273654 A1 | 12/2005 | Chen et al. |
| 2006/0020660 A1 | 1/2006 | Prasad et al. |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0098041 A1 | 4/2008 | Chidambaran et al. |
| 2008/0244172 A1 | 10/2008 | Kano |
| 2008/0244204 A1 | 10/2008 | Cremelie et al. |
| 2008/0250204 A1 | 10/2008 | Kavuri et al. |
| 2008/0281908 A1 | 11/2008 | McCanne et al. |
| 2008/0320151 A1 | 12/2008 | McCanne et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0183162 A1 | 7/2009 | Kindel et al. |
| 2009/0204649 A1 | 8/2009 | Wong et al. |
| 2009/0217265 A1 | 8/2009 | Ishikawa |
| 2009/0268903 A1 | 10/2009 | Bojinov et al. |
| 2009/0276454 A1 | 11/2009 | Smith |

(56) References Cited

U.S. PATENT DOCUMENTS

| | | |
|---|---|---|
| 2009/0327625 A1 | 12/2009 | Jaquette et al. |
| 2010/0070478 A1 | 3/2010 | Anglin |
| 2010/0082558 A1 | 4/2010 | Anglin et al. |
| 2010/0088296 A1 | 4/2010 | Periyagaram et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |
| 2010/0312752 A1 | 12/2010 | Zeis et al. |
| 2010/0318759 A1 | 12/2010 | Hamilton et al. |
| 2011/0099154 A1 | 4/2011 | Maydew et al. |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0161723 A1 | 6/2011 | Taleck et al. |
| 2011/0191834 A1 | 8/2011 | Singh et al. |
| 2011/0258161 A1 | 10/2011 | Constantinescu et al. |
| 2011/0265083 A1 | 10/2011 | Davis |
| 2011/0302140 A1 | 12/2011 | Gokhale et al. |
| 2012/0016839 A1 | 1/2012 | Yueh |
| 2012/0089574 A1 | 4/2012 | Doerner |
| 2012/0150818 A1 | 6/2012 | Vijayan Retnamma et al. |
| 2012/0233417 A1 | 9/2012 | Kalach |
| 2013/0227552 A1 | 8/2013 | Reddin |
| 2013/0339298 A1 | 12/2013 | Muller et al. |
| 2013/0339310 A1 | 12/2013 | Muller et al. |
| 2013/0339407 A1 | 12/2013 | Sharpe et al. |
| 2013/0346709 A1 | 12/2013 | Wang |
| 2014/0181438 A1 | 6/2014 | Varadharajan |
| 2014/0181441 A1 | 6/2014 | Kottomtharayil |
| 2014/0181443 A1 | 6/2014 | Kottomtharayil |
| 2014/0201150 A1 | 7/2014 | Kumarasamy et al. |
| 2014/0201485 A1 | 7/2014 | Ahn |
| 2014/0324793 A1 | 10/2014 | Glazemakers |
| 2015/0127658 A1 | 5/2015 | Ding et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0370495 A1 | 12/2015 | Georgiev |
| 2016/0004611 A1 | 1/2016 | Lakshman et al. |
| 2016/0019224 A1 | 1/2016 | Ahn |
| 2016/0062846 A1 | 3/2016 | Nallathambi et al. |
| 2016/0065671 A1 | 3/2016 | Nallathambi et al. |
| 2016/0139836 A1 | 5/2016 | Nallathambi et al. |
| 2016/0142483 A1 | 5/2016 | Nallathambi et al. |
| 2016/0350302 A1 | 12/2016 | Lakshman |
| 2016/0350391 A1 | 12/2016 | Vijayan et al. |
| 2016/0371104 A1 | 12/2016 | Zamir |
| 2017/0192861 A1 | 7/2017 | Vijayan et al. |
| 2017/0192868 A1 | 7/2017 | Vijayan et al. |
| 2017/0193003 A1 | 7/2017 | Vijayan et al. |
| 2017/0329527 A1 | 11/2017 | Lakshman et al. |
| 2017/0329530 A1 | 11/2017 | Laksham |
| 2020/0356277 A1 | 11/2020 | Lakshman et al. |

FOREIGN PATENT DOCUMENTS

| | | |
|---|---|---|
| WO | WO 2012/044366 | 4/2012 |
| WO | WO 2012/044367 | 4/2012 |
| WO | WO 2013/188550 | 12/2013 |

OTHER PUBLICATIONS

Lakshman et al. U.S. Appl. No. 15/155,838, filed May 16, 2016.
Office Action dated Nov. 19, 2018 for U.S. Appl. No. 15/155,838.
Final Office Action dated Feb. 8, 2018 for U.S. Appl. No. 15/155,838.
Office Action dated Jul. 3, 2017 for U.S. Appl. No. 15/155,838.
Office Action dated Mar. 19, 2020 for U.S. Appl. No. 15/155,838.
Notice of Allowance dated Jul. 11, 2020 for U.S. Appl. No. 15/155,838.
Office Action dated Jul. 6, 2017, for U.S. Appl. No. 15/156,015.
Office Action dated Feb. 8, 2018, for U.S. Appl. No. 15/156,015.
Office Action dated Nov. 7, 2018, for U.S. Appl. No. 15/156,015.
Final Office Action ated Aug. 8, 2019, for U.S. Appl. No. 15/156,015.
Lakshman, et al. U.S. Appl. No. 15/156,015, filed May 16, 2016.
U.S. Appl. No. 16/352,606, filed Mar. 13, 2019.
U.S. Appl. No. 16/569,385, filed Sep. 12, 2019.
Bhagwat, Extreme Binning: Scalable, Parallel Deduplication for Chunk-based File Backup. IEEE 2009, 9 pages.
Cohen, Edith, et al., "The Age Penalty and Its Effect on Cache Performance." In USITS, pp. 73-84. 2001.
Cohen, et al., "Aging through cascaded caches: Performance issues in the distribution of web content." In ACM SIGCOMM Computer Communication Review, vol. 31, No. 4, pp. 41-53. ACM, 2001.
Cohen, et al.,"Refreshment policies for web content caches." Computer Networks 38.6 (2002): 795-808.
CommVault Systems, Inc. "Continuous Data Replicator 7.0," Product Data Sheet, 2007.
CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.
CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.
Dubnicki, et al. "HYDRAstor: A Scalable Secondary Storage." FAST. vol. 9.2009, 74 pages.
Wei, et al., "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999.
Wu, et al., Load Balancing and Hot Spot Relief for Hash Routing among a Collection of Proxy Caches, 1999.
International Search Report and Written Opinion, International Application No. PCT/US2009/58137, dated Dec. 23, 2009, 14 pages.
International Search Report and Written Opinion, International Application No. PCT/US2011/030804, dated Jun. 9, 2011.
International Search Report and Written Opinion, International Application No. PCT/US2011/030814, dated Jun. 9, 2011.
International Search Report and Written Opinion, International Application No. PCT/US2013/045443 dated Nov. 14, 2013, 16 pages.
International Search Report and Written Opinion, International Application No. PCT/US2013/045443 dated Dec. 16, 2014, 11 pages.
Final Office Action dated Aug. 8, 2019 for U.S. Appl. No. 15/156,015.
Lakshman, et al., U.S. Appl. No. 15/155,838 Published as 2017/0329527 A1, filed May 16, 2016, Global De-Duplication of Virtual Disks in a Storage Platform.
Lakshman, et al., U.S. Appl. No. 15/156,015 U.S. Pat. No. 10,795,577, filed May 16, 2016, De-Duplication of Client-Side Data Cache for Virtual Disks.
Lakshman, et al., U.S. Appl. No. 16/937,401, filed Jul. 23, 2020, De-duplication of Client-Side Data Cache for Virtual Disks.
PTAB-IPR2021-00609—('048) POPR Final, filed Jun. 16, 2021, in 28 pages.
PTAB-IPR2021-00609—Mar. 10, 2021 IPR Petition—pty, Mar. 10, 2021, in 89 pages.
PTAB-IPR2021-00609—Exhibit 1001—U.S. Pat. No. 10,210,048, Issue Date Feb. 19, 2019, in 49 pages.
PTAB-IPR2021-00609—Exhibit 1002—Sandeep Expert Declaration,dated Mar. 10, 2021, in 176 pages.
PTAB-IPR2021-00609—Exhibit 1003—U.S. Pat. No. 9,354,927 (Hiltgen), Issue Date May 31, 2016, in 35 pages.
PTAB-IPR2021-00609—Exhibit 1004—U.S. Pat. No. 8,677,085 (Vaghani), Issue Date Mar. 18, 2014, in 44 pages.
PTAB-IPR2021-00609—Exhibit 1005—U.S. Pat. No. 9,639,428 (Boda), Issue Date May 2, 2017, in 12 pages.
PTAB-IPR2021-00609—Exhibit 1006—US20150212895A1 (Pawar), Publication Date Jul. 30, 2015, in 60 pages.

(56) References Cited

OTHER PUBLICATIONS

PTAB-IPR2021-00609—Exhibit 1007—U.S. Pat. No. 9,665,386 (Bayapuneni), Issue Date May 30, 2017, in 18 pages.
PTAB-IPR2021-00609—Exhibit 1008—Popek and Golberg, Jul. 1974, in 10 pages.
PTAB-IPR2021-00609—Exhibit 1009—Virtualization Essentials—First Edition (2012)—Excerpted, 2012, in 106 pages.
PTAB-IPR2021-00609—Exhibit 1010—Virtual Machine Monitors Current Technology and Future Trends, May 2005, in 9 pages.
PTAB-IPR2021-00609—Exhibit 1011—Virtualization Overview, 2005, in 11 pages.
PTAB-IPR2021-00609—Exhibit 1012—Let's Get Virtual A Look at Today's Virtual Server, May 14, 2007, in 42 pages.
PTAB-IPR2021-00609—Exhibit 1013—Virtual Volumes, Jul. 22, 2016, in 2 pages.
PTAB-IPR2021-00609—Exhibit 1014—Virtual Volumes and the SDDC—Virtual Blocks, Internet Archives on Sep. 29, 2015, in 4 pages.
PTAB-IPR2021-00609—Exhibit 1015—NEC White Paper—VMWare vSphere Virtual Volumes (2015), Internet Archives Dec. 4, 2015 in 13 pages.
PTAB-IPR2021-00609—Exhibit 1016—EMC Storage and Virtual Volumes, Sep. 16, 2015 in 5 pages.
PTAB-IPR2021-00609—Exhibit 1017—U.S. Pat. No. 8,621,460 (Evans), Issue Date Dec. 31, 2013, in 39 pages.
PTAB-IPR2021-00609—Exhibit 1018—U.S. Pat. No. 7,725,671 (Prahlad), Issue Date May 25, 2010, in 48 pages.
PTAB-IPR2021-00609—Exhibit 1019—Assignment—Vaghani to VMWare, Feb. 8, 2012, in 8 pages.
PTAB-IPR2021-00609—Exhibit 1020—Assignment Docket—Vaghani, Nov. 11, 2011, in 1 page.
PTAB-IPR2021-00609—Exhibit 1021—Dive into the VMware ESX Server hypervisor—IBM Developer, Sep. 23, 2011, in 8 pages.
PTAB-IPR2021-00609—Exhibit 1022—MS Computer Dictionary Backup labeled, 2002 in 3 pages.
PTAB-IPR2021-00609—Exhibit 1023—2014-07-07_VMware vSphere Blog, Jun. 30, 2014, 4 pages.
PTAB-IPR2021-00609—Exhibit 1024—*CommVault v. Rubrik Complaint*, filed on Apr. 21, 2020, in 29 pages.
PTAB-IPR2021-00609—Exhibit 1025—*CommVault v. Cohesity Complaint*, filed on Apr. 21, 2020, in 28 pages.
PTAB-IPR2021-00609—Exhibit 1026—Feb. 17, 2021 (0046) Scheduling Order, filed on Feb. 17, 2021, in 15 pages.
PTAB-IPR2021-00609—Exhibit 2001—Prosecution History_Part1, Issue Date Feb. 19, 2019, in 300 pages, Part 1 of 2.
PTAB-IPR2021-00609—Exhibit 2001—Prosecution History_Part2, Issue Date Feb. 19, 2019, in 265 pages, Part 2 of 2.
PTAB-IPR2021-00609—Exhibit 2002—Jones Declaration, dated Jun. 16, 2021, in 38 pages.
PTAB-IPR2021-00609—Exhibit 3001—RE_IPR2021-00535, 2021-00589, 2021-00590, 2021-00609, 2021-00673, 2021-00674, 2021-00675, dated Aug. 30, 2021, in 2 pages.
PTAB-IPR2021-00609—Joint Motion to Terminate. Filed Aug. 31, 2021, in 7 pages.
PTAB-IPR2021-00609—Joint Request to Seal Settlement Agreement, filed Aug. 31, 2021, in 4 pages.
PTAB-IPR2021-00609—Termination Order, Sep. 1, 2021, in 4 pages.
Case No. No. 6:21-CV-00634-ADA, Answer WDTX-6-21-cv-00634-19, filed Aug. 27, 2021, in 23 pages.
Case No. 1:21-cv-00537, Complaint WDTX-1-21-cv-00537-1_WDTX-6-21-cv-00634-1, filed Jun. 18, 2021, in 44 pages.
Case No. 6:21-cv-00634-ADA, Order Dismissing with Prejudice WDTX-6-21-cv-00634-22, filed Sep. 1, 2021, in 1 page.
Case No. 1:20-cv-00524-MN, Order Dismissing with Prejudice DDE-1-20-cv-00524-101, filed Aug. 31, 2021, in 1 page.
Case No. 1:20-cv-00524-MN, Amended_Complaint_DDE-1-20-cv-00524-13, filed on Jul. 27, 2020, in 30 pages.
Case No. 1:20-cv-00524-MN, First_Amended_Answer_DDE-1-20-cv-00524-96, filed Jul. 23, 2021, in 41 pages.
Case No. 1:20-cv-00524-MN, Stipulation_DDE-1-20-cv-00524-93, filed Jul. 14, 2021, in 3 pages.
Case No. 1:20-cv-00524-MN, Oral Order DDE-1-20-cv-00524-86_DDE-1-20-cv-00525-87, filed Jun. 29, 2021, in 1 page.
Case No. 1:20-cv-00524-MN, Complaint_DDE-1-20-cv-00524-1, filed on Apr. 21, 2020 in 28 pages.
Case No. 1:20-cv-00524-MN, Answer_DDE-1-20-cv-00524-45, filed Feb. 16, 2021, in 25 pages.
Case No. 1:20-cv-00524-MN, Order_DDE-1-20-cv-00525-38_DDE-1-20-cv-00524-42, filed Feb. 10, 2021, in 4 pages.
PTAB-IPR2021-00673—('723) POPR Final, filed Jun. 30, 2021, in 70 pages.
PTAB-IPR2021-00673—('723) Sur-Reply Final, filed Aug. 16, 2021, in 7 pages.
PTAB-IPR2021-00673—723 patent IPR—Reply to POPR, filed Aug. 9, 2021, in 6 pages.
PTAB-IPR2021-00673—2021-03-17_Petition_723, filed Mar. 17, 2021, in 98 pages.
PTAB-IPR2021-00673—Exhibit 1001—U.S. Pat. No. 9,740,723, Issue Date Aug. 22, 2017, in 51 pages.
PTAB-IPR2021-00673—Exhibit 1002—Declaration_Jagadish_EXSRanger, filed Mar. 16, 2021, in 191 pages.
PTAB-IPR2021-00673—Exhibit 1003—FH 9740723, Issue Date Aug. 22, 2017, in 594 pages.
PTAB-IPR2021-00673—Exhibit 1004—esxRangerProfessionalUserManual v.3.1, 2006 in 102 pages.
PTAB-IPR2021-00673—Exhibit 1005—VC_Users_Manual_11_NoRestriction, Copyright date 1998-2004, in 466 pages.
PTAB-IPR2021-00673—Exhibit 1006—U.S. Pat. No. 8,635,429—Naftel, Issue Date Jan. 21, 2014, in 12 pages.
PTAB-IPR2021-00673—Exhibit 1007—US20070288536A1—Sen, Issue Date Dec. 13, 2007, in 12 pages.
PTAB-IPR2021-00673—Exhibit 1008—US20060224846A1—Amarendran, Oct. 5, 2006, in 15 pages.
PTAB-IPR2021-00673—Exhibit 1009—U.S. Pat. No. 8,209,680—Le, Issue Date Jun. 26, 2012, in 55 pages.
PTAB-IPR2021-00673—Exhibit 1010—Virtual Machine Monitors Current Technology and Future Trends, May 2005 in 9 pages.
PTAB-IPR2021-00673—Exhibit 1011—Virtualization Overview, Copyright 2005, VMware, Inc., 11 pages.
PTAB-IPR2021-00673—Exhibit 1012—Let's Get Virtual A Look at Today's Virtual Server, May 14, 2007 in 42 pages.
PTAB-IPR2021-00673—Exhibit 1013—U.S. Pat. No. 8,135,930—Mattox, Issue Date Mar. 13, 2012, in 19 pages.
PTAB-IPR2021-00673—Exhibit 1014—U.S. Pat. No. 8,060,476—Afonso, Issue Date Nov. 15, 2011, in 46 pages.
PTAB-IPR2021-00673—Exhibit 1015—U.S. Pat. No. 7,823,145—Le 145, Issue Date Oct. 26, 2010, in 24 pages.
PTAB-IPR2021-00673—Exhibit 1016—US20080091655A1—Gokhale, Publication Date Apr. 17, 2008, in 14 pages.
PTAB-IPR2021-00673—Exhibit 1017—US20060259908A1—Bayer, Publication Date Nov. 16, 2006, in 8 pages.
PTAB-IPR2021-00673—Exhibit 1018—U.S. Pat. No. 8,037,016—Odulinski, Issue Date Oct. 11, 2011, in 20 pages.
PTAB-IPR2021-00673—Exhibit 1019—U.S. Pat. No. 7,925,850—Waldspurger, Issue Date Apr. 12, 2011, in 23 pages.
PTAB-IPR2021-00673—Exhibit 1020—U.S. Pat. No. 8,191,063—Shingai, May 29, 2012, in 18 pages.
PTAB-IPR2021-00673—Exhibit 1021—U.S. Pat. No. 8,959,509B1—Sobel, Issue Date Feb. 17, 2015, in 9 pages.
PTAB-IPR2021-00673—Exhibit 1022—U.S. Pat. No. 8,458,419—Basler, Issue Date Jun. 4, 2013, in 14 pages.
PTAB-IPR2021-00673—Exhibit 1023—D. Hall_Internet Archive Affidavit & Ex. A, dated Jan. 20, 2021, in 106 pages.
PTAB-IPR2021-00673—Exhibit 1024—esxRangerProfessionalUserManual, 2006, in 103 pages.
PTAB-IPR2021-00673—Exhibit 1025—D.Hall_Internet Archive Affidavit & Ex. A (source html view), dated Jan. 27, 2021, in 94 pages.
PTAB-IPR2021-00673—Exhibit 1026—Scripting VMware (excerpted) (GMU), 2006, in 19 pages.
PTAB-IPR2021-00673—Exhibit 1027—How to cheat at configuring VMware ESX server (excerpted), 2007, in 16 pages.

(56) References Cited

OTHER PUBLICATIONS

PTAB-IPR2021-00673—Exhibit 1028—Robs Guide to Using VMware (excerpted), Sep. 2005 in 28 pages.
PTAB-IPR2021-00673—Exhibit 1029—Hall-Ellis Declaration, dated Feb. 15, 2021, in 55 pages.
PTAB-IPR2021-00673—Exhibit 1030—B. Dowell declaration, dated Oct. 15, 2020, in 3 pages.
PTAB-IPR2021-00673—Exhibit 1031—Vizioncore esxEssentials Review ZDNet, Aug. 21, 2007, in 12 pages.
PTAB-IPR2021-00673—Exhibit 1032—ZDNet Search on_ howorth—p. 6 _, printed on Jan. 15, 2021, ZDNet 3 pages.
PTAB-IPR2021-00673—Exhibit 1033—ZDNet_ Reviews _ ZDNet, printed on Jan. 15, 02021, in 33 pages.
PTAB-IPR2021-00673—Exhibit 1034—Understanding VMware Consolidated Backup, 2007, 11 pages.
PTAB-IPR2021-00673—Exhibit 1035—techtarget.com news links—May 2007, May 20, 2007, in 39 pages.
PTAB-IPR2021-00673—Exhibit 1036—ITPro 2007 Issue 5 (excerpted), Sep.-Oct. 2007 in 11 pages.
PTAB-IPR2021-00673—Exhibit 1037—InfoWorld—Feb. 13, 2006, Feb. 13, 2006, in 17 pages.
PTAB-IPR2021-00673—Exhibit 1038—InfoWorld—Mar. 6, 2006, Mar. 6, 2006, in 18 pages.
PTAB-IPR2021-00673—Exhibit 1039—InfoWorld—Apr. 10, 2006, Apr. 10, 2006, in 18 pages.
PTAB-IPR2021-00673—Exhibit 1040—InfoWorld—Apr. 17, 2006, Apr. 17, 2006, in 4 pages.
PTAB-IPR2021-00673—Exhibit 1041—InfoWorld—May 1, 2006, May 1, 2006, in 15 pages.
PTAB-IPR2021-00673—Exhibit 1042—InfoWorld—Sep. 25, 2006, Sep. 25, 2006, in 19 pages.
PTAB-IPR2021-00673—Exhibit 1043—InfoWorld—Feb. 5, 2007, Feb. 5, 2007, in 22 pages.
PTAB-IPR2021-00673—Exhibit 1044—InfoWorld—Feb. 12, 2007, Feb. 12, 2007, in 20 pages.
PTAB-IPR2021-00673—Exhibit 1045—Informationweek—Aug. 14, 2006, Aug. 14, 2006, in 17 pages.
PTAB-IPR2021-00673—Exhibit 1046—esxRanger Ably Backs Up VMs, May 2, 2007 in 6 pages.
PTAB-IPR2021-00673—Exhibit 1047—Businesswire—Vizioncore Inc. Releases First Enterprise-Class Hot Backup and Recovery Solution for VMware Infrastructure, Aug. 31, 2006 in 2 pages.
PTAB-IPR2021-00673—Exhibit 1048—Vizioncore Offers Advice to Help Users Understand VCB for VMwar, Jan. 23, 2007 in 3 pages.
PTAB-IPR2021-00673—Exhibit 1049—Dell Power Solutions—Aug. 2007 (excerpted), Aug. 2007 in 21 pages.
PTAB-IPR2021-00673—Exhibit 1050—communities-vmware-t5-VI-VMware-ESX-3-5-Discussions, Jun. 28, 2007, in 2 pages.
PTAB-IPR2021-00673—Exhibit 1051—Distributed_File_System_ Virtualization, Jan. 2006, pp. 45-56, in 12 pages.
PTAB-IPR2021-00673—Exhibit 1052—Distributed File System Virtualization article abstract, 2006, in 12 pages.
PTAB-IPR2021-00673—Exhibit 1053—Cluster Computing _ vol. 9, issue 1, Jan. 2006 in 5 pages.
PTAB-IPR2021-00673—Exhibit 1054—redp3939—Server Consolidation with VMware ESX Server, Jan. 12, 2005 in 159 pages.
PTAB-IPR2021-00673—Exhibit 1055—Server Consolidation with VMware ESX Server _ Index Page, Jan. 12, 2005 in 2 pages.
PTAB-IPR2021-00673—Exhibit 1056—Apr. 21, 2020 [1] Complaint, filed Apr. 21, 2020, in 300 pages.
PTAB-IPR2021-00673—Exhibit 1057—Feb. 17, 2021 (0046) Scheduling Order, filed Feb. 17, 2021, in 15 pages.
PTAB-IPR2021-00673—Exhibit 1058—Novell Netware 5.0-5.1 Network Administration (Doering), Copyright 2001 in 40 pages.
PTAB-IPR2021-00673—Exhibit 1059—US20060064555A1 (Prahlad 555), Publication Date Mar. 23, 006, in 33 pages.
PTAB-IPR2021-00673—Exhibit 1060—Carrier Book, 2005 in 94 pages.
PTAB-IPR2021-00673—Exhibit 2001 Jones Declaration, filed Jun. 30, 2021, in 35 pages.
PTAB-IPR2021-00673—Exhibit 2002 VM Backup Guide 3.0.1, updated Nov. 21, 2007, 74 pages.
PTAB-IPR2021-00673—Exhibit 2003 VM Backup Guide 3.5, updated Feb. 21, 2008, 78 pages.
PTAB-IPR2021-00673—Exhibit 3001 RE_ IPR2021-00535, 2021-00589, 2021-00590, 2021-00609, 2021-00673, 2021-00674, 2021-00675, Aug. 30, 2021, in 2 pages.
PTAB-IPR2021-00673—Joint Motion to Terminate, filed Aug. 31, 2021, in 7 pages.
PTAB-IPR2021-00673—Joint Request to Seal Settlement Agreement, filed Aug. 31, 2021, in 4 pages.
PTAB-IPR2021-00673—673 674 Termination Order, Sep. 1, 2021, in 4 pages.
PTAB-IPR2021-00673—Patent Owner Mandatory Notices, filed Apr. 7, 2021, 6 pages.
PTAB-IPR2021-00674—(723) POPR Final, filed Jul. 8, 2021, in 70 pages.
PTAB-IPR2021-00674—Mar. 31, 2021 723 Petition, filed Mar. 31, 2021, in 87 pages.
PTAB-IPR2021-00674—Mar. 31, 2021 Explanation for Two Petitions, filed Mar. 31, 2021, in 9 pages.
PTAB-IPR2021-00674—Exhibit 1001—U.S. Pat. No. 9,740,723, Issue Date Aug. 22, 2017, in 51 pages.
PTAB-IPR2021-00674—Exhibit 1002—Jagadish Declaration, dated Mar. 31, 2021, in 200 pages.
PTAB-IPR2021-00674—Exhibit 1003—U.S. Pat. No. 9,740,723 file history, Issue Date Aug. 22, 2017, in 594 pages.
PTAB-IPR2021-00674—Exhibit 1004—Virtual Machine Monitors Current Technology and Future Trends, May 2005, in 9 pages.
PTAB-IPR2021-00674—Exhibit 1005—Virtualization Overview, 2005, 11 pages.
PTAB-IPR2021-00674—Exhibit 1006—Let's Get Virtual_Final Stamped, May 14, 2007, in 42 pages.
PTAB-IPR2021-00674—Exhibit 1007—U.S. Pat. No. 8,458,419—Basler, Issue Date Jun. 4, 2013, in 14 pages.
PTAB-IPR2021-00674—Exhibit 1008—US20080244028A1 (Le), Publication Date Oct. 2, 2008, in 22 pages.
PTAB-IPR2021-00674—Exhibit 1009—60920847 (Le Provisional), Filed Mar. 29, 2007, in 70 pages.
PTAB-IPR2021-00674—Exhibit 1010—Discovery Systems in Ubiquitous Computing (Edwards), 2006, in 8 pages.
PTAB-IPR2021-00674—Exhibit 1011—HTTP The Definitive Guide excerpts (Gourley), 2002, in 77 pages.
PTAB-IPR2021-00674—Exhibit 1012—VCB White Paper (Wayback Mar. 21, 2007), retrieved Mar. 21, 2007, Coypyright Date 1998-2006, in 6 pages.
PTAB-IPR2021-00674—Exhibit 1013—Scripting VMware excerpts (Muller), 2006, in 66 pages.
PTAB-IPR2021-00674—Exhibit 1014—Rob's Guide to Using VMWare excerpts (Bastiaansen), Sep. 2005, in 178 pages.
PTAB-IPR2021-00674—Exhibit 1015—Carrier, 2005 in 94 pages.
PTAB-IPR2021-00674—Exhibit 1016—U.S. Pat. No. 7,716,171 (Kryger), Issue Date May 11, 2010, in 18 pages.
PTAB-IPR2021-00674—Exhibit 1017—RFC2609, Jun. 1999, in 33 pages.
PTAB-IPR2021-00674—Exhibit 1018—MS Dictionary excerpt, 2002, in 3 pages.
PTAB-IPR2021-00674—Exhibit 1019—*Commvaultv. Rubrik Complaint*, Filed Apr. 21, 2020, in 29 pages.
PTAB-IPR2021-00674—Exhibit 1020—*Commvaultv. Rubrik Scheduling Order*, Filed Feb. 17, 2021, in 15 pages.
PTAB-IPR2021-00674—Exhibit 1021—Duncan Affidavit, Dated Mar. 3, 2021, in 16 pages.
PTAB-IPR2021-00674—Exhibit 1022—Hall-Ellis Declaration, dated Mar. 30, 2021, in 291 pages.
PTAB-IPR2021-00674—Exhibit 1023—Digital_Data_Integrity_ 2007_Appendix_A_UMCP, 2007, in 24 pages.
PTAB-IPR2021-00674—Exhibit 1024—Rob's Guide—Amazon review (Jan. 4, 2007), retrieved Jan. 4, 2007, in 5 pages.
PTAB-IPR2021-00674—Exhibit 2001—esxRanger, 2006, in 102 pages.

(56) References Cited

OTHER PUBLICATIONS

PTAB-IPR2021-00674—Exhibit 2002—Want, 1995, in 31 pages.
PTAB-IPR2021-00674—Exhibit 2003—Shea, retrieved Jun. 10, 2021, in 5 pages.
PTAB-IPR2021-00674—Exhibit 2004—Jones Declaration, Dated Jul. 8, 2021, in 36 pages.
PTAB-IPR2021-00674—Exhibit 3001, dated Aug. 30, 2021, in 2 pages.
PTAB-IPR2021-00674—Exhibit IPR2021-00674 Joint Request to Seal Settlement Agreement, dated Aug. 31, 2021, in 4 pages.
PTAB-IPR2021-00674—Joint Motion to Terminate, Filed Aug. 31, 2021, in 7 pages.
PTAB-IPR2021-00674—Response to Notice Ranking Petitions Final, filed Jul. 8, 2021, in 7 pages.
PTAB-IPR2021-00674—Termination Order, filed Sep. 1, 2021, in 4 pages.
Case No. 1:20-cv-00525-MN, Amended Complaint DDE-1-20-cv-00525-15, filed Jul. 27, 2020, in 30 pages.
Case No. 1:20-cv-00525-MN, Complaint DDE-1-20-cv-00525-1, Apr. 21, 2020, in 28 pages.
Case No. 1:20-cv-00525-MN, First Amended Answer DDE-1-20-cv-00525-95, filed Jul. 23, 2021, in 38 pages.
Case No. 1:20-cv-00525-MN, Joint Claim Construction Brief Exhibits DDE-1-20-cv-00525-107-1, filed Oct. 1, 2021, in 488 pages (in 7 parts).
Case No. 1:20-cv-00525-MN, Oral Order DDE-1-20-cv-00524-78_DDE-1-20-cv-00525-77, dated May 24, 2021, in 1 page.
Case No. 1:20-cv-00525-MN, Oral Order DDE-1-20-cv-00524-86_DDE-1-20-cv-00525-87, dated Jun. 29, 2021, in 1 page.
Case No. 1:20-cv-00525-MN, Order DDE-1-20-cv-00525-38_DDE-1-20-cv-00524-42, filed Feb. 10, 2021, in 4 pages.
Case No. 20-525-MN-CJB, Joint Claim Construction Brief DDE-1-20-cv-00525-107, filed Oct. 1, 2021, in 79 pages.
Case No. 20-525-MN-CJB, Joint Claim Construction Statement DDE-1-20-cv-00525-119, filed Oct. 29, 2021, in 12 pages.
Case No. 20-525-MN-CJB, Farnan Letter DDE-1-20-cv-00525-111, filed Oct. 6, 2021, in 2 pages.
Case No. 20-525-MN-CJB, Farnan Letter Exhibit A DDE-1-20-cv-00525-111-1, filed Oct. 6, 2021, in 7 pages.
Lakshman et al., "Cassandra—A Decentralized Structured Storage System", https://doi.org/10.1145/1773912.1773922, ACM SIGOPS Operating Systems Review, vol. 44, Issue 2, Apr. 2010, pp. 35-40.

Virtual Disk Management Add Disk

De-Duplication Table

System De-Duplication Disk

GLOBAL DE-DUPLICATION OF VIRTUAL DISKS IN A STORAGE PLATFORM

CROSS-REFERENCE TO RELATED APPLICATIONS

This application is a Continuation of U.S. patent application Ser. No. 15/155,838 file on May 16, 2016, which is hereby incorporated by reference in its entirety herein. This application is related to U.S. patent application Ser. Nos. 14/322,813, 14/322,832, 14/684,086, 14/322,850, 14/322,855, 14/322,867, 14/322,868, 14/322,871, and 14/723,380, which are all hereby incorporated by reference. This application is related to U.S. patent application Ser. No. 15/156,015, which is hereby incorporated by reference.

FIELD OF THE INVENTION

The present invention relates generally to data storage within a data center. More specifically, the present invention relates to de-duplication of data on virtual disks over various data centers.

BACKGROUND OF THE INVENTION

In the field of data storage, enterprises have used a variety of techniques in order to store the data that their software applications use. At one point in time, each individual computer server within an enterprise running a particular software application (such as a database or e-mail application) would store data from that application in any number of attached local disks. Although this technique was relatively straightforward, it led to storage manageability problems in that the data was stored in many different places throughout the enterprise.

These problems led to the introduction of the storage area network in which each computer server within an enterprise communicated with a central storage computer node that included all of the storage disks. The application data that used to be stored locally at each computer server was now stored centrally on the central storage node via a fiber channel switch, for example. Although such a storage area network was easier to manage, changes in computer server architecture created new problems.

With the advent of virtualization, each computer server can now host dozens of software applications through the use of a hypervisor on each computer server and the use of virtual machines. Thus, computer servers which had been underutilized could now host many different server applications, each application needing to store its data within the storage area network. Weaknesses in the storage area network were revealed by the sheer number of server applications needing to access disks within the central storage node. And, even with the use of remote storage platforms (such as "in-the-cloud" storage), problems still exist.

For example, the sheer amount of data that applications desire to store in a remote storage platform can overwhelm the platform, raise costs, and lead to inefficiency. Attempts to remove duplicates of data have been tried but are not optimal. Accordingly, further techniques and systems are desired to remove duplicates of data within a storage platform.

SUMMARY OF THE INVENTION

To achieve the foregoing, and in accordance with the purpose of the present invention, techniques are disclosed that provide the advantages discussed below.

In order to avoid writing duplicates of blocks of data into a storage platform, any virtual disk within the storage platform may have a de-duplication feature enabled. In one embodiment, all virtual disks have this feature enabled. For virtual disks with de-duplication enabled, a unique message digest is calculated for every block of data written to that virtual disk. Upon a write, these message digests may be consulted in order to determine if a particular block of data has already been written, if so, it is not written again, and if not, it is written. In one particular embodiment, all de-duplication virtual disks are written to a single system virtual disk within the storage platform. De-duplication occurs over the entire storage platform and over all of its virtual disks because all message digests are consulted before a write is performed for any virtual disk.

In a first embodiment when writing to a virtual disk, the method first calculates a hash value for each block of data to be written to the storage platform from the virtual disk. Each of these hash values is compared against a table that includes all hash values of all data blocks that have been written to the storage platform. If the hash value is present, this means that the data block has already been written to the storage platform, it is not written again, and a system disk offset is retrieved from the table that corresponds to the hash value. The system disk offset is then stored in metadata of the storage platform indicating where the block of data is stored. If the hash value is not present, then the block of data is written to the storage platform into the system virtual disk at a system disk offset.

In a second embodiment when the reading from a virtual disk that has de-duplication enabled, a read request from a software application includes a virtual disk offset. Using the virtual disk offset, a virtual machine retrieves from the storage platform a corresponding system disk offset of the system virtual disk. The system virtual disk is used by all virtual disks of the storage platform that have de-duplication enabled and does not include any duplicate blocks of data. Next, the system disk offset is used to read from the system virtual disk from one of the storage nodes of the storage platform, the data desired by the read request. The data is then returned to the requesting software application.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Storage System

Figure 1:
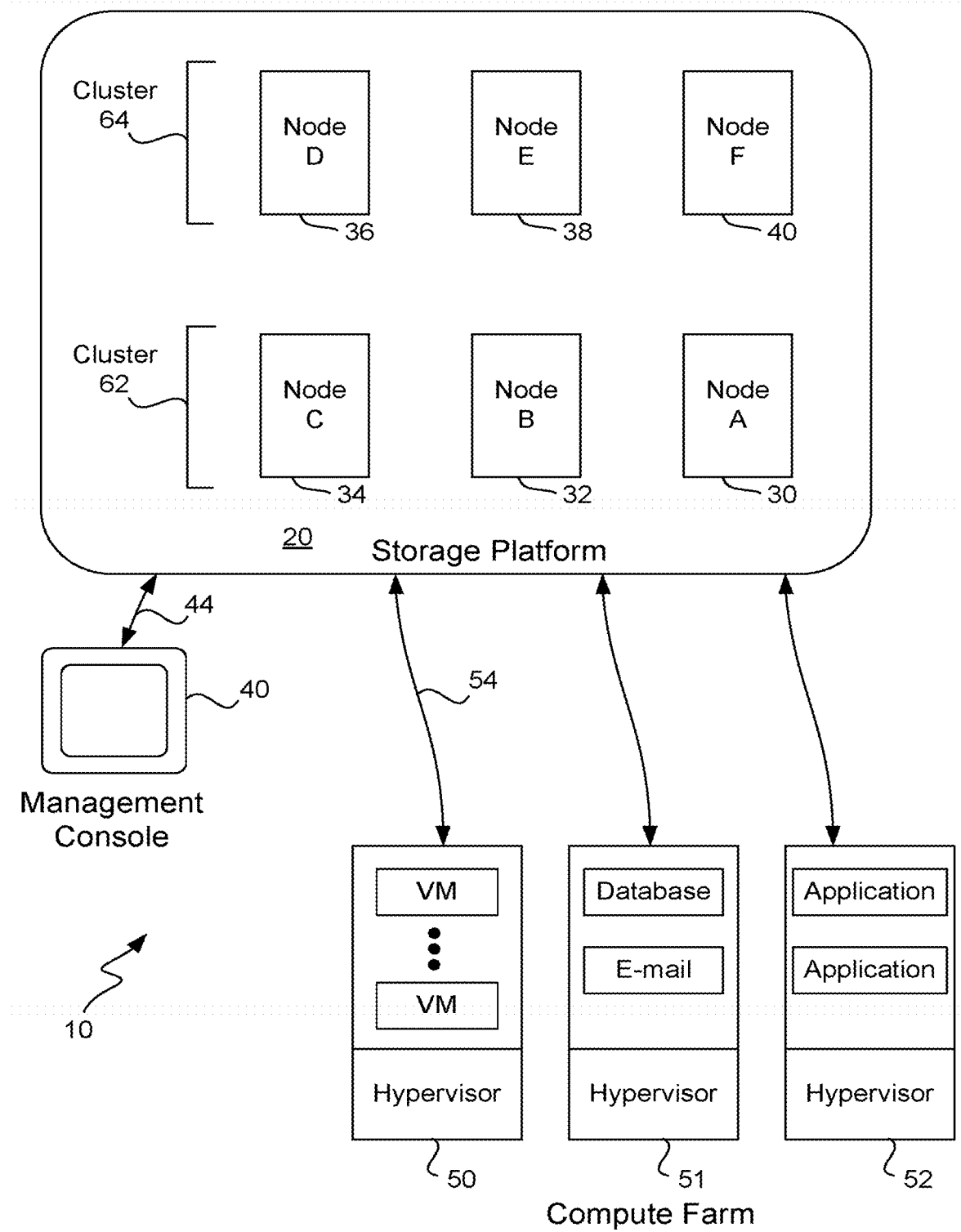
FIG. 1 illustrates a data storage system having a storage platform according to one embodiment of the invention.

FIG. 1 illustrates a data storage system 10 according to one embodiment of the invention having a storage platform 20. Included within the storage platform 20 are any number of computer nodes 30-40. Each computer node of the storage platform has a unique identifier (e.g., "A") that uniquely identifies that computer node within the storage platform. Each computer node is a computer having any number of hard drives and solid-state drives (e.g., flash drives), and in one embodiment includes about twenty disks of about 1 TB each. A typical storage platform may include on the order of about 81 TB and may include any number of computer nodes. One advantage is that a platform may start with as few as three nodes and then grow incrementally to as large as 1,000 nodes or more.

Computers nodes 30-40 are shown logically being grouped together, although they may be spread across data centers and may be in different geographic locations. A management console 40 used for provisioning virtual disks within the storage platform communicates with the platform over a link 44. Any number of remotely located computer servers 50-52 each typically executes a hypervisor in order to host any number of virtual machines. Server computers 50-52 form what is typically referred to as a compute farm, and although such a compute farm may belong to a single company, it is contemplated that any number of such computer servers or compute farms will be storing data within storage platform 20, and that these computer servers may represent many different companies and enterprises.

As shown, these virtual machines may be implementing any of a variety of applications such as a database server, an e-mail server, etc., including applications from companies such as Oracle, Microsoft, etc. These applications write to and read data from the storage platform using a suitable storage protocol such as iSCSI or NFS, although each application will not be aware that data is being transferred over link 54 using a different protocol.

Management console 40 is any suitable computer or computers able to communicate over an Internet connection or link 44 with storage platform 20. When an administrator of a particular enterprise wishes to manage the storage platform (e.g., provisioning a virtual disk, snapshots, revert, clone, analyze metrics, determine health of cluster, etc.) he or she uses the management console to access the storage platform and is put in communication with a management console routine executing as part of metadata module 130 on any one of the computer nodes within the platform. The management console routine is typically a Web server application.

In order to provision a new virtual disk within storage platform 20 for a particular application running on a virtual machine, the virtual disk is first created and then attached to a particular virtual machine. In order to create a virtual disk, a user uses the management console to first select the size of the virtual disk (e.g., 100 GB), and then selects the individual policies that will apply to that virtual disk. For example, the user selects a replication factor, a data center aware policy, whether de-duplication is enabled, and other policies concerning whether or not to compress the data, the type of disk storage, etc. Once the virtual disk has been created, it is then attached to a particular virtual machine within one of the computer servers 50-52 and the provisioning process is complete.

Advantageously, storage platform 20 is able to simulate prior art central storage nodes (such as the VMax and Clarion products from EMC, VMWare products, etc.) and the virtual machines and application servers will be unaware that they are communicating with storage platform 20 instead of a prior art central storage node. In addition, the provisioning process can be completed on the order of minutes or less, rather than in four to eight weeks as was typical with prior art techniques. The advantage is that one only need to add metadata concerning a new virtual disk in order to provision the disk and have the disk ready to perform writes and reads. No allocation of actual physical storage is needed.

Thus, storage system 10 may be utilized by any number of companies, clients, enterprises etc., each of whom creates any number virtual disks to be stored within storage platform 20. The system will store the data pertaining to these various virtual disks in any suitable location, and is then able to perform de-duplication of data at the system level rather than at a more local level.

Figure 2:
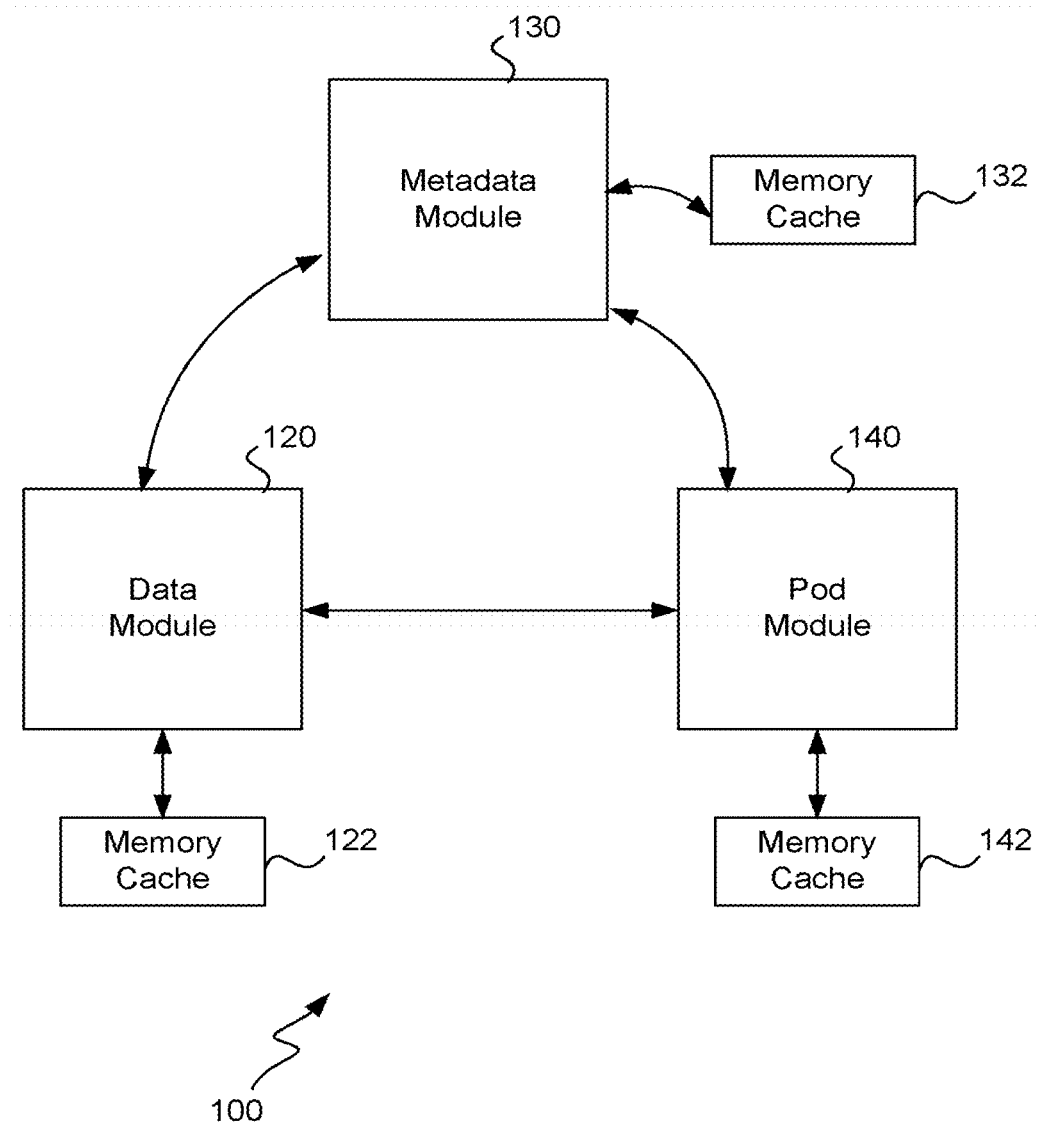
FIG. 2 illustrates software modules used within the storage system.

FIG. 2 illustrates software modules used within storage system 10. Shown is a data module 120, a metadata module 130 and a pod module 140. Data module handles the storage of data (such as blocks of data, files, objects, etc.) onto individual computer nodes 30-40. Metadata module handles the storage of metadata within the platform, that is, data that helps describe the data. Metadata includes all of the virtual disk information described below in FIG. 4, for example. Pod module is a coordinator module and also stores transaction states.

Although shown as three modules, each of the modules runs independently on each of the computer nodes within the platform 20. Also, associated with each module on each node is a memory cache 122, 132 and 142 that stores information used by that module; each module on each computer node may also use persistent storage on that node. A file (for example) that is stored on nodes 32, 34 and 36 (FIG. 1), is referred to as being stored on its "data nodes 32, 34 and 36." The metadata for that file may be stored on three different nodes, and those nodes for that file are referred to as the "metadata nodes 30, 36 and 38." The data nodes and metadata nodes for a particular stored file may be the same or may be different. The modules communicate with each other via a modified version of Gossip over TCP, and work in concert to manage the storage platform.

Controller Virtual Machine

Figure 3:
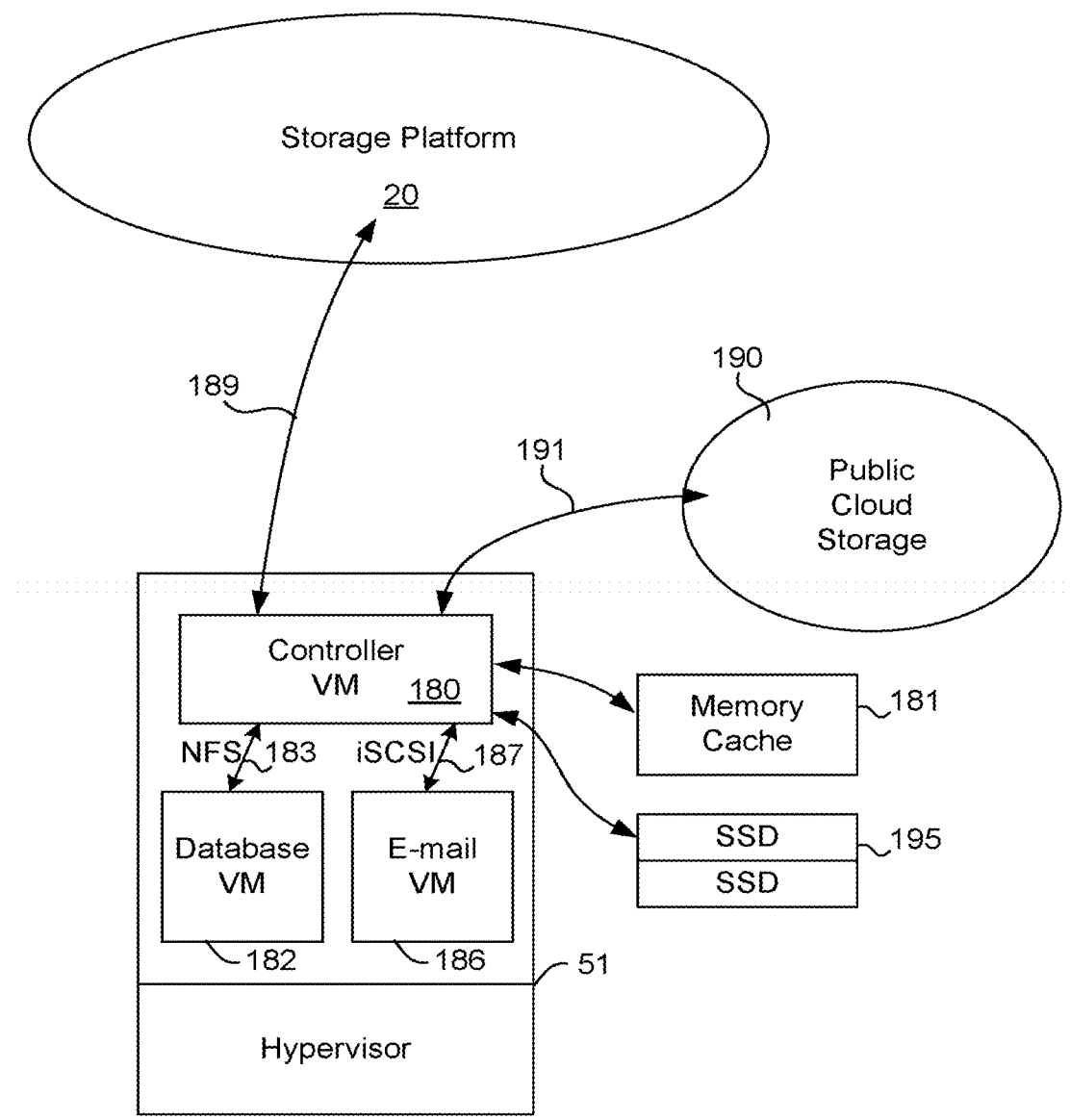
FIG. 3 illustrates in greater detail the computer servers in communication with the storage platform.

FIG. 3 illustrates in greater detail one of the computer servers 51 in communication with storage platform 20. As mentioned above, each computer server may host any number of virtual machines, each executing a particular software application. The application may perform I/O handling using a block-based protocol such as iSCSI, using a file-based protocol such as NFS, and the virtual machine communicates using this protocol. Of course, other suitable protocols may also be used by an application. The actual communication protocol used between the server and platform is transparent to these virtual machines.

As shown, server 51 includes a hypervisor and virtual machines 182 and 186 that desire to perform I/O handling using the iSCSI protocol 187 or the NFS protocol 183. Server 51 also includes a specialized controller virtual machine (CVM) 180 that is adapted to handle communications with the virtual machines using either protocol (and others), yet communicates with the storage platform using a proprietary protocol 189. Protocol 189 may be any suitable protocol for passing data between storage platform 20 and a remote computer server 51 such as TCP. In addition, the CVM may also communicate with public cloud storage using the same or different protocol 191. Advantageously, the CVM need not communicate any "liveness" information between itself and the computer nodes of the platform. There is no need for any CVM to track the status of nodes in the cluster. The CVM need only talk to a node in the platform, which is then able to route requests to other nodes and public storage nodes.

The CVM also uses a memory cache 181 on the computer server 51. In communication with computer server 51 and with CVM 180 are also any number of solid-state disks (or other similar persistent storage) 195. These disks may be used as a data cache to also store data blocks that are written into storage platform 20. This cache may be used to rapidly retrieve data blocks instead of retrieving them from the remote storage platform.

CVM 180 handles different protocols by simulating an entity that the protocol would expect. For example, when communicating under the iSCSI block protocol, CVM responds to an iSCSI Initiation by behaving as an iSCSI Target. In other words, when virtual machine 186 performs I/O handling, it is the iSCSI Initiator and the controller virtual machine is the iSCSI Target. When an application is using the block protocol, the CVM masquerades as the iSCSI Target, traps the iSCSI CDBs, translates this information into its own protocol, and then communicates this information to the storage platform. Thus, when the CVM presents itself as an iSCSI Target, the application may simply talk to a block device as it would do normally.

Similarly, when communicating with an NFS client, the CVM behaves as an NFS server. When virtual machine 182 performs I/O handling the controller virtual machine is the NFS server and the NFS client (on behalf of virtual machine 182) executes either in the hypervisor of computer server 51 or in the operating system kernel of virtual machine 182. Thus, when an application is using the NFS protocol, the CVM masquerades as an NFS server, captures NFS packets, and then communicates this information to the storage platform using its own protocol.

An application is unaware that the CVM is trapping and intercepting its calls under the SCSI or NFS protocol, or that the CVM even exists. One advantage is that an application need not be changed in order to write to and read from the storage platform. Use of the CVM allows an application executing upon a virtual machine to continue using the protocol it expects, yet allows these applications on the various computer servers to write data to and read data from the same storage platform 20.

Replicas of a virtual disk may be stored within public cloud storage 190. As known in the art, public cloud storage refers to those data centers operated by enterprises that allow the public to store data for a fee. Included within these data centers are those known as Amazon Web Services and Google Compute. During a write request, the write request will include an identifier for each computer node to which a replica should be written. For example, nodes may be identified by their IP address. Thus, the computer node within the platform that first fields the write request from the CVM will then route the data to be written to nodes identified by their IP addresses. Any replica that should be sent to the public cloud can then simply be sent to the DNS name of a particular node which request (and data) is then routed to the appropriate public storage cloud. Any suitable computer router within the storage platform may handle this operation.

Global De-Duplication of Data

As mentioned earlier, prior art techniques are not optimal at removing duplicates of data (i.e. "de-duplication" of data) that may be stored within a storage platform. Prior art techniques typically only attempt to remove duplicates of data at the disk or volume level. Even if a prior art technique were to remove duplicates at a cluster level or data center level, there would still be inefficiency. The inventors of the present invention have realized that as a storage system, such as storage system 10, serves many different clients, and is able to store data within a variety of data centers and public cloud storage, that removal of duplicate data should occur at the system level, over all clients, data centers and storage platforms encompassed within the storage system. Thus, de-duplication can occur over all virtual disks within the storage system, regardless of which client owns which virtual disk, and regardless of where the virtual disk is physically stored.

Moreover, it is realized that de-duplication can occur locally in a compute farm, as data is being written to a storage platform, rather than attempting to iterate over all computers and disk drives within the storage platform after the data has been stored. In addition, such de-duplication still respects the concept of data replication, and can perform de-duplication on any size data block.

Provision Virtual Disk for De-Duplication

Figure 4:
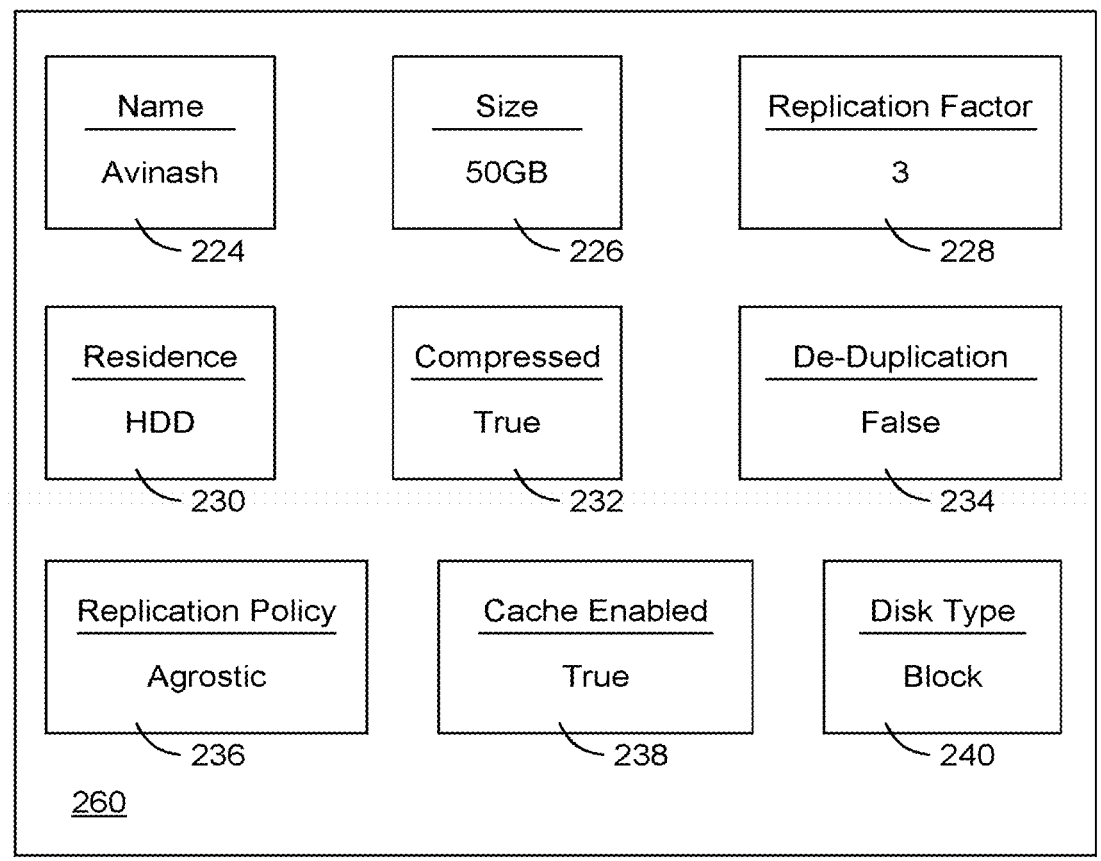
FIG. 4 illustrates a user interface window presented to an administrator in the course of provisioning a virtual disk within the platform.

FIG. 4 illustrates a user interface window 220 presented to an administrator in the course of provisioning a virtual disk within platform 20. In this situation, the administrator is aware that a particular software application desires a virtual disk within the platform and is aware of the characteristics that the virtual disk should have. The administrator first uses the management console to access the platform and connect with the management console Web server on any one of the computer nodes within the platform. One of the characteristics for the virtual disk that may be chosen is whether or not the virtual disk should be de-duplicated. Applications that typically store unique data such as image files may not desire de-duplication (as de-duplication can add overhead), while applications that store text files (such as e-mail messages) may desire de-duplication. De-duplication, thus, is an optional feature that may be turned on or off for each virtual disk.

The administrator chooses the "Add Disk" option from within the management console routine and is presented with a window such as window 220 in order to choose the characteristics of the new virtual disk. For example, the administrator chooses: a name 224 for the new virtual disk; a size 226 for the virtual disk; a replication factor 228 (indicating how many replicas of the data should be stored within the platform); a residence 230 (indicating whether the data on the virtual disk should be stored on hard disk drives, on flash drives or on any other type of storage drive); compressed 232 (indicating whether the data on the virtual disk should be compressed or not); a replication policy 236 (agnostic, data center aware, rack aware, or hybrid cloud aware); cache enabled 238 (a quality of service choice); and disk type 240 (indicating whether the virtual disk is of a block type—the iSCSI protocol—or whether the virtual disk is of a file type—the NFS protocol).

Option de-duplication 234 indicates whether duplicates of the data should be saved to the virtual disk or not. Selecting "True" indicates that de-duplication is turned "on" and that duplicates of the data for this virtual disk will not be written to the platform, while selecting "False" indicates that de-duplication is turned "off" and that it is possible that duplicates of the data will be written to the platform.

Figure 10:
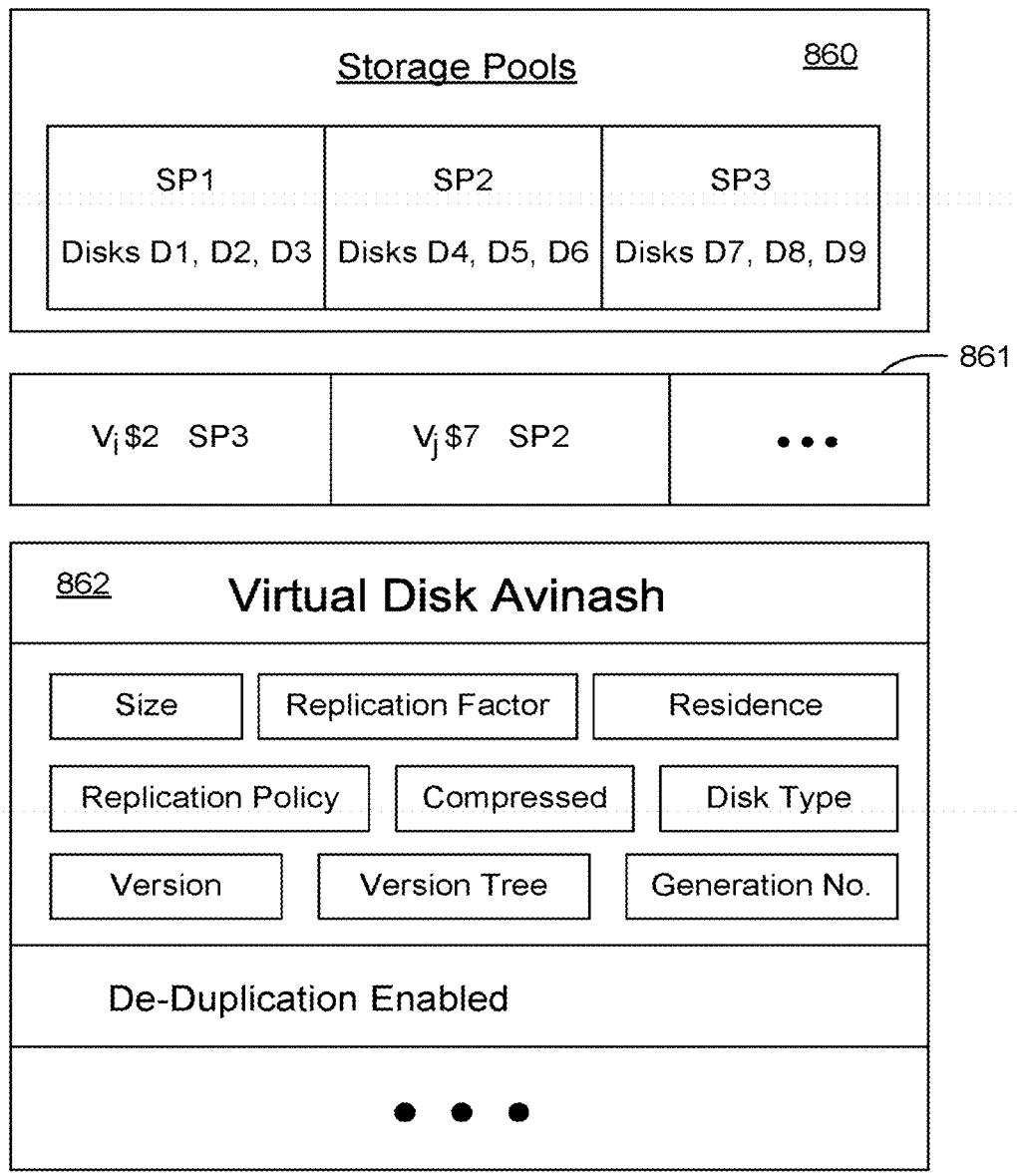
FIGS. 10 and 11 illustrate metadata storage within the platform.

Once chosen, these characteristics are stored as "virtual disk information" 260 onto computer nodes within the storage platform. Preferably, this virtual disk information is replicated and stored on at least three different computer nodes. The metadata module 130 on these three computer nodes handles the storage of this information by placing it into persistent storage as shown in FIG. 10 as described below. In one embodiment, a hash function is used upon the virtual disk name 224 in order to produce a hash value which is then used to select three computer nodes within the platform. For example, the virtual disk information for the newly created virtual disk may be stored upon nodes 36, 30 and 40. In this fashion, the virtual disk metadata has been stored upon three metadata nodes within the platform (which might be different from the nodes where the actual data of the virtual disk will be stored).

The virtual disk that has been created is also attached to a virtual machine of the compute farm. In this step, the administrator is aware of which virtual machine on which computer of the compute farm needs the virtual disk. Thus, information regarding the newly created virtual disk (i.e., name, space available, etc.) is sent from the management console routine over link 189 to the appropriate computer within the compute farm. The information is provided to the controller virtual machine 180 which stores the information in cache 181, ready for use when the virtual machine needs to write or to read data. The administrator also supplies the name of the virtual disk to the application that will use it. At this time, no information need be sent from the storage platform or from the CVM to the application. Cache 181 thus contains option 234 indicating whether not the newly provisioned virtual disk desires de-duplication or not.

Figure 13:
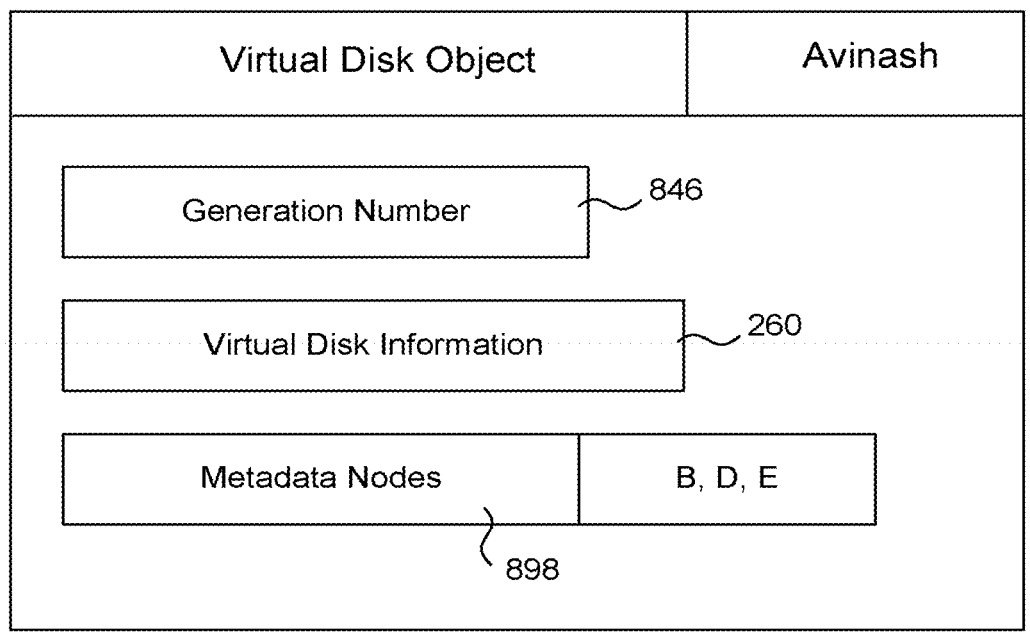
FIG. 13 shows information that may be stored within a memory cache of a controller virtual machine (CVM) on one of the computer servers in the compute farm.
Figure 13:

In addition, the identities of the metadata nodes which store this metadata for the virtual disk is also sent to the controller virtual machine for placing into cache 181. Thus, the controller virtual machine is aware of on which compute nodes of the storage platform the metadata for a particular virtual disk is stored as shown in FIG. 13.

Virtual Disks, De-Duplication Table and System Disk

Figure 5:
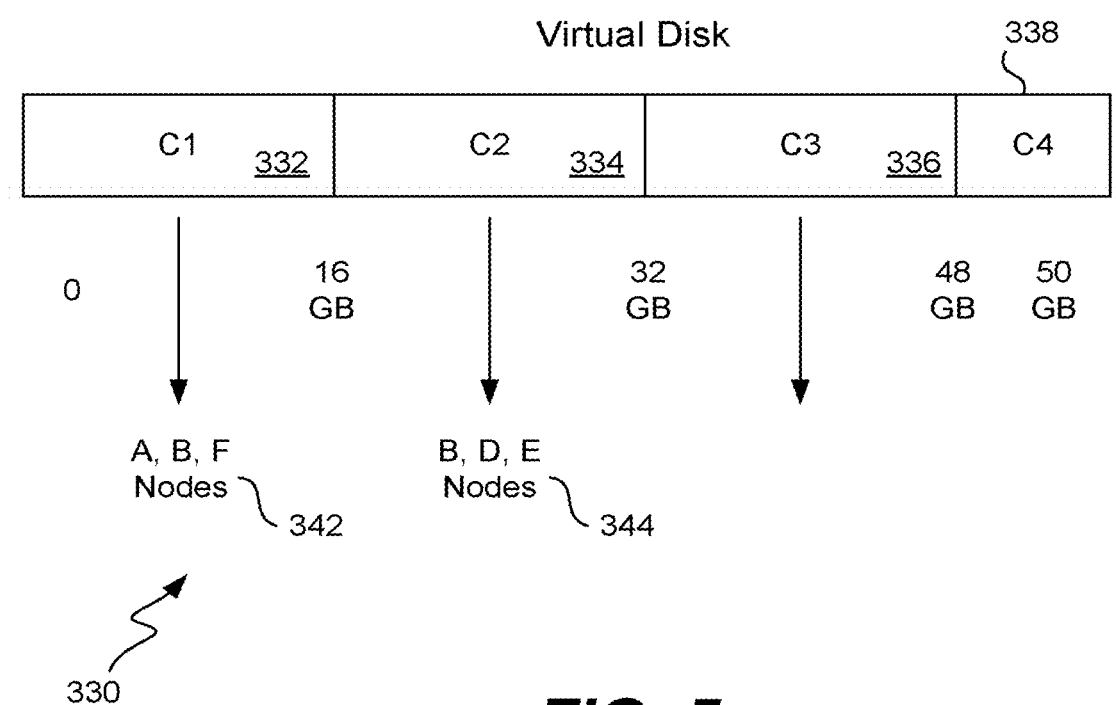
FIG. 5 is a symbolic representation of a virtual disk showing how data within the virtual disk is stored within the storage platform and is referred to in the description of FIG. 9.
Figure 9:
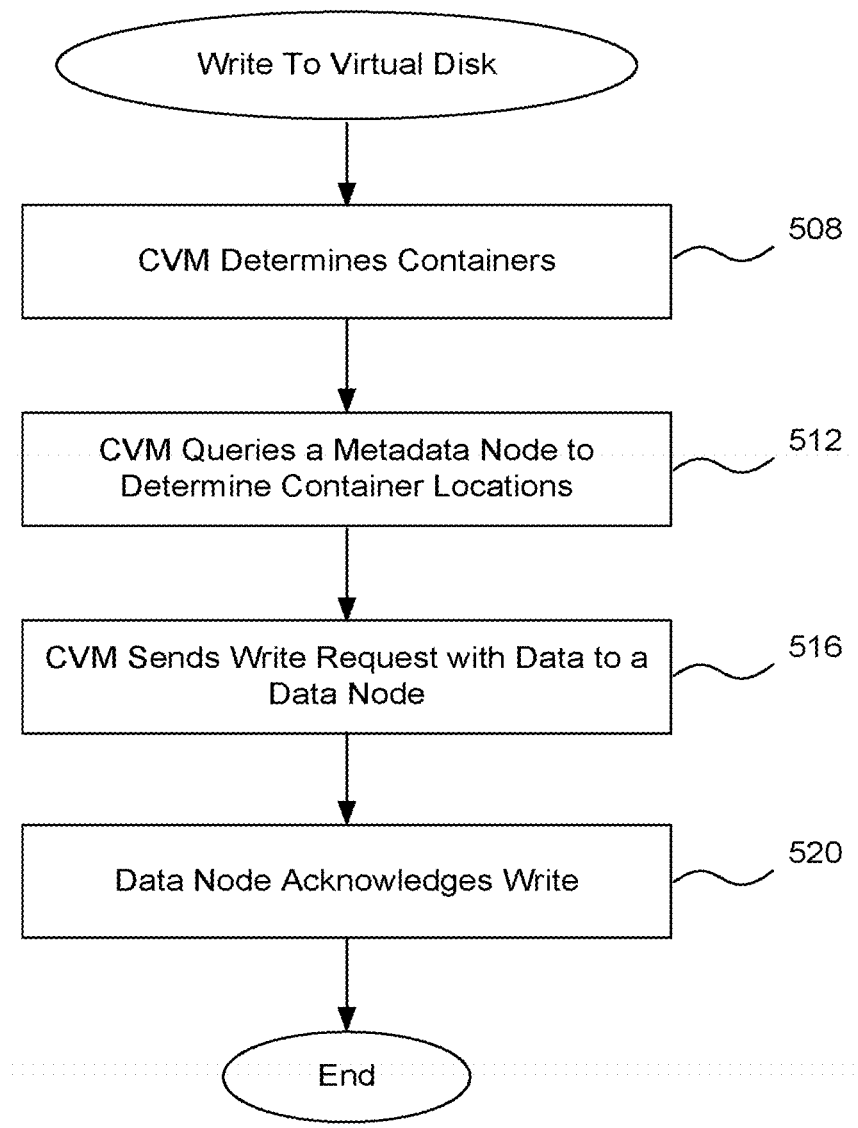
FIG. 9 describes one embodiment by which a CVM writes unique blocks to a virtual disk in the storage platform.

FIG. 5 is a symbolic representation of a virtual disk 330 showing how data within the virtual disk is stored within the storage platform and will be referred to in the description of FIG. 9. As shown, the virtual disk has been provisioned as a disk holding up to 50 GB, and the disk has been logically divided into segments or portions of 16 GB each. Each of these portions is termed a "container," and may range in size from about 4 GB up to about 32 GB, although a size of 16 GB works well. As shown, the first portion 332 is referred to as container one, or C1, while the latter portions 334-338 are referred to respectively as containers C2, C3 and C4. Note that the final container may have a size less than the sizes of the other containers. Containers have a particular naming convention. In one implementation, the convention is that the first container of a virtual disk will have a name that is the concatenation of: virtual disk name, "$" and "1." The second container of that virtual disk will have a nearly identical name except that the final symbol will be a "2." In this fashion, by knowing the container name, one knows with which virtual disk the container is associated. In addition, by knowing the virtual disk name, and an offset and size, one will be able to determine the names of the containers associated with a particular write request. In this fashion, each container name is unique within the entire storage platform.

Similar to a traditional hard disk, as data is written to the virtual disk the virtual disk will fill up symbolically from left to right, that is, first filling container C1 and then container C2, etc. Each container of data will be stored upon a particular node or nodes within the storage platform that are chosen during the write process. If no replication is chosen, then data within a particular container will be stored on one node, while if replication is two, for example, then data within that container will be stored upon two nodes. In the example of FIG. 5, the replication factor is three, thus, data stored within container 332 will be stored upon the three nodes A, B and F. Any data stored within the second container 334 will be stored upon the three nodes B, D and E. Note that the set of nodes 342 and 344 might be the same nodes, may be completely different nodes, or may have nodes in common.

It is possible that when a particular file (for example) is written from a virtual machine to a virtual disk on the storage platform that the file may be written to two different containers, meaning that the file could potentially be stored upon six different computer nodes if the replication factor is three. For example, if virtual disk 330 already contains 12 GB of data and an 8 GB file is to be written, then this file will span containers C1 and C2 because the division between the containers is at 16 GB. Thus, the first 4 GB of file will be written into the nodes designated for container C1, while the second 4 GB of the file will be written into the nodes designated for container C2. Note that this storage technique using containers is an implementation of the storage platform and is totally transparent to the virtual machines that are storing data. In this fashion, use of the containers spreads the storage of a virtual disk throughout many different computer nodes within the storage platform.

In order to assist with the de-duplication of data on virtual disks within the storage platform, a de-duplication table is used as well as a system de-duplication disk. These structures are only used with virtual disks for which de-duplication has been turned "on."

Figures 6, 7:
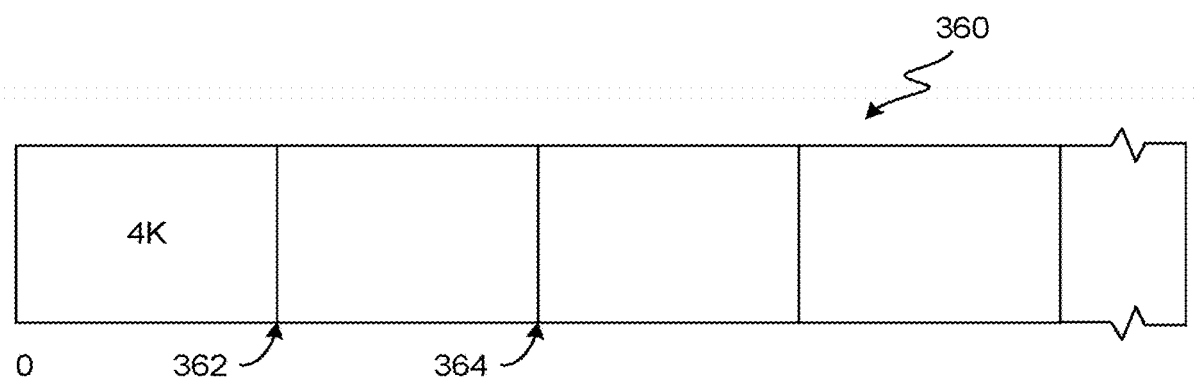
FIG. 6 illustrates a de-duplication table that is maintained by the metadata module of each storage node.
FIG. 7 is an example of a system de-duplication disk found within the storage platform.

FIG. 6 illustrates a de-duplication table 310 that is maintained by the metadata module of each storage node. This table may be stored in the memory cache associated with each metadata module and may also be stored in persistent storage on the storage node. The same table may be stored and maintained by each metadata module within the platform. In a preferred embodiment, there will be three copies of the de-duplication table. Three nodes are chosen from the nodes in platform 20, and that is where copies of de-duplication table 310 will reside.

Field 320 is the MD5 of a block of data that has been written to the storage platform for a virtual disk for which de-duplication has been turned on. Field 324 is the corresponding disk offset in the system de-duplication disk (explained below) for each MD5. Although the hash function MD5 is used, any other suitable hash function may be used to produce a unique number for a block of data. Accordingly, pairs of data in columns 320 and 324 form "key-value" pairs that indicate, for each MD5, where within the system de-duplication disk that particular block of data may be found. In one embodiment, table 310 is divided into 64 "buckets," each bucket holding a range of pairs that are known by the CVM. The CVM can thus specify a certain bucket in the table to search in, thus helping with locking and unlocking when other CVMs access the same table.

FIG. 7 is an example of a system de-duplication disk 360 found within storage platform 20. System disk 360 is a virtual disk similar to other virtual disks within the platform, except that it is hidden from clients and only accessible by the storage platform system software, typically the metadata and data modules. As will be explained in greater detail below, all data for any virtual disk that has de-duplication enabled will be written sequentially to system disk 360. As shown, data may be written in blocks (typically, of size 4 k) at offsets shown at 0, 362, 364, etc. For example, if a first virtual disk writes a file of size 64 k that contains data unique to the storage platform, then all this data will be written sequentially onto system disk 360 in blocks of 4 k. De-duplication table 310 will then be updated to include the 16 MD5's for these blocks and their corresponding offsets within the system disk. If a second virtual disk then writes another file of size 64 k that contains the exact same data as in the first file, no data will be written to the storage platform because the data already exists. Rather, the metadata for this second file will be updated to indicate that the blocks of data for this second file can be found in the system disk and at the offsets previously stored in table 310 for the first file.

De-Duplication Write

Figure 8:
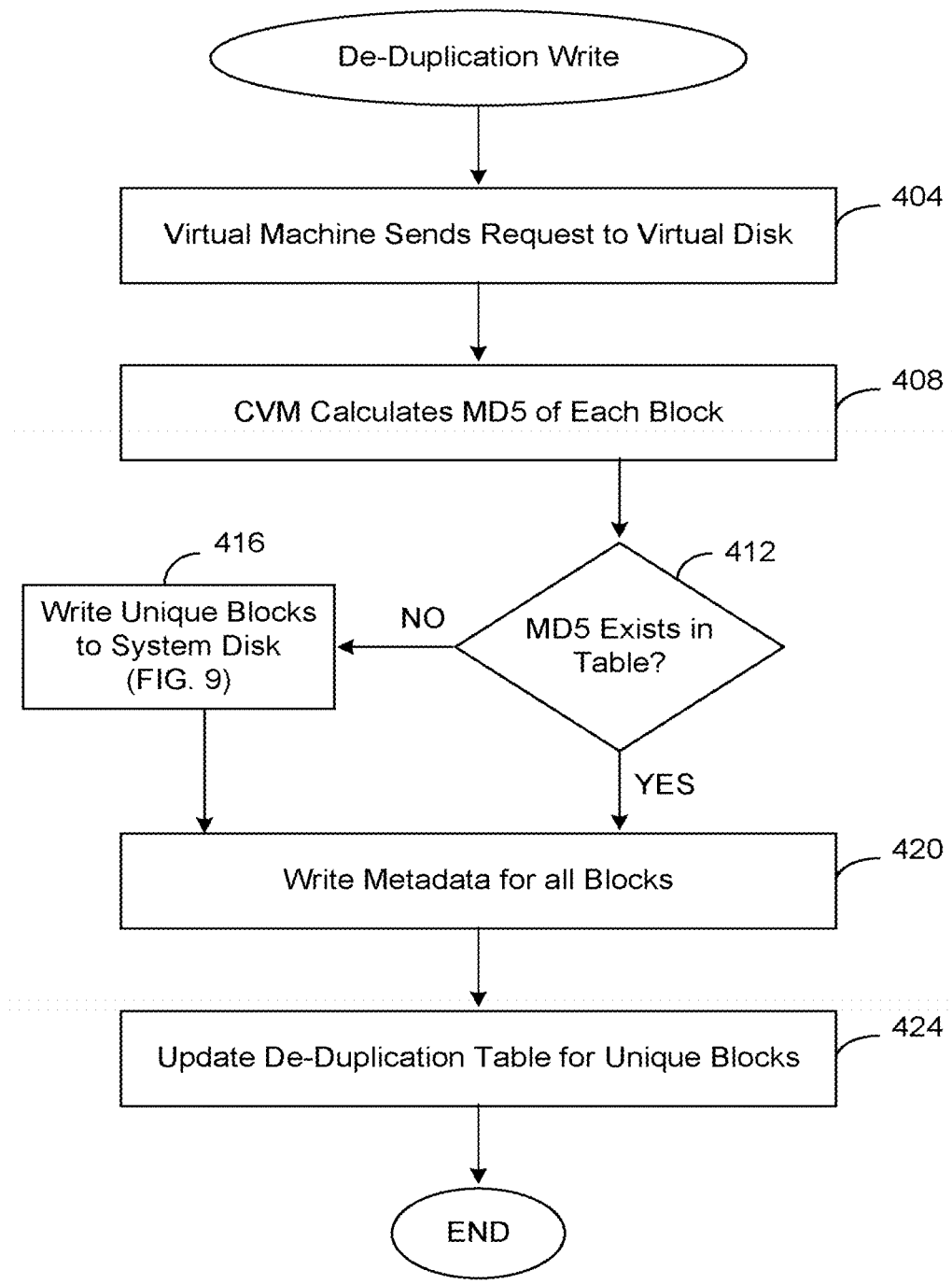
FIG. 8 is a flow diagram describing one embodiment by which a virtual machine writes data to the storage platform that will not be duplicated.

FIG. 8 is a flow diagram describing one embodiment by which a virtual machine writes data to the storage platform that will not be duplicated. In this embodiment, an application on a virtual machine is writing to a virtual disk within the platform that has de-duplication enabled. The CVM is aware of which virtual disks are enabled for de-duplication and which are not because it has stored virtual disk information 260 into its memory cache 181. For writes to a virtual disk for which de-duplication is not enabled, only steps 404, 416 and 420 need be performed. Note, though, that for a virtual disk in which de-duplication is not enabled, step 416 will write the data to the named virtual disk rather than to system disk 360.

In step 404 the virtual machine (on behalf of its software application) that desires to write data into the storage platform sends a write request including the data to be written to a particular virtual disk. As mentioned, a write request may originate with any of the applications on one of computer servers 50-52 and may use any of a variety of storage protocols. The write request typically takes the form: write (offset, size, virtual disk name). The parameter "virtual disk name" is the name of the virtual disk originally selected as option 224. The parameter "offset" is an offset within the virtual disk (i.e., a value from 0 up to the size of the virtual disk), and the parameter "size" is the length of the data to be written in bytes. As mentioned above, the CVM will trap or capture this write request sent by the application (in the block protocol or NFS protocol, for example).

Next, in step 408 the CVM calculates the MD5 of each block within the data to be written. Blocks may be of any size, although typically the size is 4 k bytes. After all of the message digests have been calculated (or perhaps after each one is calculated), in step 412 the CVM contacts one of the metadata modules executing on any one of the storage nodes within the storage platform in order to determine if each MD5 exists within de-duplication table 310. If the MD5 exists, this indicates that that exact block of data has already been written somewhere in the storage platform for any virtual disk and that it will not be necessary to write that block of data again. If the MD5 does not exist, this indicates that the block of data does not exist within the storage platform yet and that the data block should be written. It is possible that within the data requested to be written, that some blocks already exist within the platform and that some do not. It is also possible that the MD5s for certain blocks will be the same (e.g., if all of these blocks are entirely filled with zeros), in this situation, only one request of the metadata module need be performed for this single MD5. For each query of table 310 with an MD5, the result returned from the metadata module is whether or not the MD5 exists, and if it exists, the system disk offset 324 is also returned.

In an alternative embodiment, the de-duplication table 310 is also stored within a cache of the CVM, for example, in persistent storage 195. Thus, before step 412, the CVM first checks this cache in order to determine if each MD5 exists within the table. If an MD5 is found, then it is not necessary to contact a metadata node for that particular MD5. If an MD5 is not found, then it may still be necessary to contact a metadata node as this cache may not include the entire table 310 because of a size limitation on the cache. When the entire table 310 is also stored within the cache, then it will not be necessary to contact a metadata node for any MD5.

For those blocks of data that do not already exist within the platform, step 416 will write those unique blocks to system disk 360 (rather than to the virtual disk named in the request of step 404) as is described below with reference to FIG. 9 as modified as follows. As mentioned earlier, in the system disk, all writes are performed sequentially. Thus, wherever the last write to the system disk left off, that is where the new write begins. The CVM knows at which offset to start writing the blocks in the system disk because for a given virtual disk to which a block was previously written to the virtual disk (e.g., the answer to step 412 was "N"), the system first determines the last system disk offset (and length) where previous blocks were written. Then, the system determines the next set of available system disk blocks and that is where we end up writing new unique data. The last system disk offset used may be stored by the CVM in a variety of locations, including in conjunction with table 310, within each CVM, within the virtual machine that sent the last write request, or in the metadata module of the storage nodes.

In one embodiment, the CVM periodically requests the next N offsets from the system disk that are available in which to write data blocks. For example, the CVM requests 1,000 offsets when needed. Thus, the CVM is aware of the available offsets and which offset was used last. This information regarding the next available N offsets and the last offset written to in the system disk may also be stored in the persistent storage in the appropriate storage nodes using the metadata module 130. Thus, in a situation where multiple CVMs need to write blocks to the system disk, each can access this persistent storage to determine which offsets are available and to which offset a block was written last. Once a CVM writes a block to the system disk at a particular offset, it updates this persistent storage so that the offset information is always up to date for the next CVM requesting a write.

Next, for those unique blocks written in step 416 and for those blocks of data for which an MD5 exists in the duplication table 310, their metadata will be written in step 420. In step 420 the CVM calculates the block identifiers (i.e., blocks 1, 2, 3) within the system virtual disk where the data has been stored and then saves this information into the metadata nodes associated with the virtual disk. As shown in FIG. 13, the CVM knows which are the metadata nodes. As is known in the art, disks are typically divided up into blocks (usually blocks of 4 k) and data is written to, and read from, disks using blocks. Because the CVM is aware of the offset for the write request, the CVM then knows the block identifier for the first block to be written for the current write request. And, because the size of the write request is also known, the CVM is then able to easily calculate onto which data nodes blocks of data were written, and the corresponding block identifiers for those blocks of data. In the current example, the CVM calculates the block identifiers for those blocks of data in the current write request which were written to nodes B, D and E (for example). Even if a write request spans two different containers, by simple calculation using the container size, offset, and size of the write request, the CVM will be able to determine which block identifiers were written to the first container and which block identifiers were written to the second container. For writes of blocks to the system disk which are not contiguous, the CVM is able to determine the block identifiers that were written.

Figure 11:
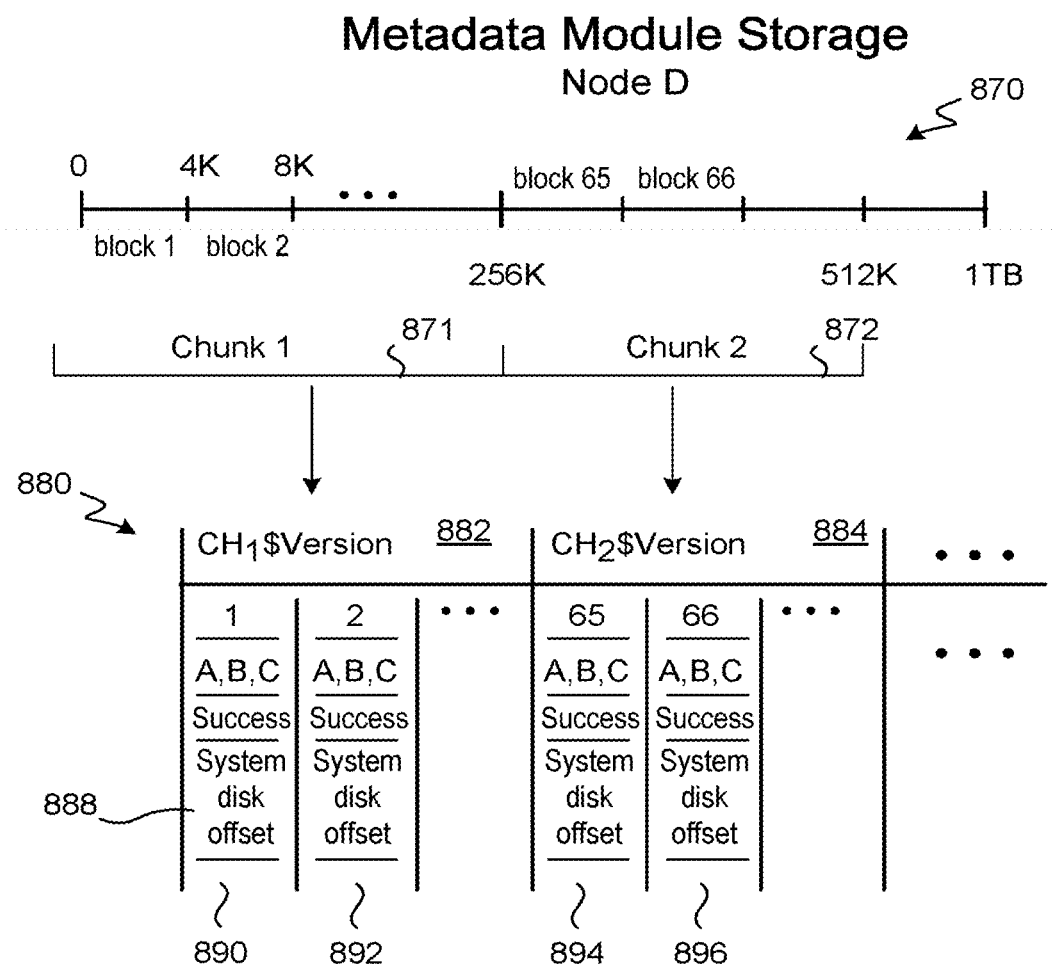

The CVM then stores these block identifiers into the three metadata nodes holding the metadata for the named virtual disk as shown in FIG. 11 as described below. Thus, these three metadata nodes are always aware which block identifiers have been written for this particular virtual disk, and where. Of course, other virtual disks that have been created within the storage platform may use different sets of three metadata nodes (or perhaps fewer or more metadata nodes) in order to store their metadata. In this step the locations of the containers (nodes and storage pools) are also written into the metadata modules associated with that virtual disk. And, the CVM sends the current version of the virtual disk with the block identifiers so that the current version may be stored along with the block identifiers in the metadata nodes as shown in FIG. 11. For non de-duplication enabled disks, the CVM also generates a timestamp and includes this timestamp along with the block identifiers so that each block includes a timestamp in metadata. For de-duplication enabled disks, a system disk offset is stored for each block.

Preferably, write operations do not overwrite older versions of data. In this fashion, earlier versions of data in a virtual disk are always available to be read. Thus, snapshot and revert operations can be performed very quickly because data does not need to be copied into special storage locations or retrieved from special storage locations. All versions of data are always available within the storage platform. As shown in FIG. 11, blocks of data are stored as "chunks," each chunk including in its name the version number which identifies the version of the data stored.

Finally, in step 424, the duplication table 310 is updated on all of the metadata modules where the table is stored. Because the unique blocks were written to the system disk 360 in step 416, the MD5 for each of these blocks will be added to table 310 along with the corresponding system disk offset 324 for that particular block. Thus, in this fashion, the MD5s for all newly written blocks will be available in the de-duplication table in order to prevent those blocks from being written again into the storage platform. In the alternative embodiment in which a cache of the CVM stores a portion of table 310, in addition to step 424, table 310 will also be updated in the cache to include the MD5s for all newly written blocks along with each corresponding system disk offset.

FIG. 9 describes one embodiment by which a CVM writes unique blocks to a virtual disk (a user virtual disk or the system virtual disk) in the storage platform. In step 508 the controller virtual machine determines which containers to use for this request based upon the offset and size parameters. For example, because the CVM is aware of the size of each container (typically 16 GB), knowing the offset and the size of the write request, the CVM is able to determine which container shall be used and whether more than one container is needed.

Step 404 provides the offset for a user virtual disk, but, in cases of a de-duplication-enabled virtual disk, and where the answer to step 412 is "No," an offset for the system disk may be determined as follows. For writing to the system virtual disk, we write sequentially. First we determine the last system disk offset (and length) that we wrote any block with. Then, we determines the next set of available system disk blocks and that is where we end up writing new unique data.

Each container is provided with a unique identifier within the platform, and containers used to write to other virtual disks will also each have an identifier unique within the platform. Assuming that only one container is needed (for example, C2, as shown in FIG. 5), the CVM then proceeds to determine on which computer nodes of the storage platform the data should be stored.

In step 512 the CVM queries a metadata node to determine on which computer nodes the container should be stored. Because the particular metadata nodes on which the metadata for the virtual disk is stored had been previously cached by the CVM (see, e.g., FIG. 13), the CVM can easily select one of these metadata nodes to query. The CVM sends a query with the container to be used (e.g., C2) and requests the return of a list of the actual data nodes on which to write that container. If that container had previously been written to that virtual disk then the metadata node knows which data nodes to return because it had previously stored that information. If this is a first write request for a particular container, then the metadata node determines which and how many computer nodes to assign to that container based upon how many replicas are needed. Once the metadata node retrieves or determines the data nodes to use for the write request, it then returns a list to the CVM (e.g., it returns a list of these nodes 344: B, D and E). The CVM is now ready to perform the write request.

In step 516 the CVM then sends the write request (the data itself to be written and the offset in the system disk for each block if the virtual disk is de-duplication enabled) to one of the data nodes returned in the previous step (e.g., data node E). The write request also includes an indication of the other two data nodes (B, D) to which the data should be written. The data node that receives the request then writes the data to its disk drives and then forwards the data to the other two nodes. Once each of these nodes writes the data to its disk drives, each of these nodes returns an acknowledgment back to the first data node that had originally received the request from the CVM. The CVM is able to specify the system disk offset because it fetches the next available offset for the system disk from one of the storage nodes, and then issues a system disk write at that offset.

In one situation when a write is performed to the system disk on behalf of a virtual disk with de-duplication enabled, it is possible that some of the blocks will be exactly the same, e.g., they are all entirely zeros. In this situation, only a single write of one of these blocks to a storage node need be performed; the metadata of all of these duplicate blocks will indicate where the one block was written to the storage node. The determination that all of these blocks are the same was made above when the MD5s were calculated.

The CVM also sends with the write request the relevant policies for the particular virtual disk. For example, the CVM indicates how many replicas are needed, the type of storage disk required, whether the data should be compressed, what the replication policy is, etc. The data node that receives the request will then handle implementations of all of these policies. The CVM does not need to concern itself with how these policies are implemented; it simply sends the write request with the relevant information.

Also in step 516, because the CVM has a cache 181 that contains the current version and version tree for each virtual disk that is attached to it (i.e., for each virtual disk used by the virtual machines on the same computer as the CVM), the CVM is also able to send the current version of the virtual disk with the write request so that as blocks of the virtual disk are written onto their data nodes the current version may be stored along with each block. A timestamp is also sent with the write request.

In addition to writing the data over an Internet connection to data nodes within a remote storage platform 20, the CVM also writes the same data blocks into solid-state storage 195 (a block cache) so that the data blocks may be read from this cache much more quickly if needed. The data blocks are identified within this cache preferably using the block identifiers shown in 870.

In step 520 this first data node (e.g., E) acknowledges that the write has occurred to the CVM and returns the names of the data nodes (e.g., B, D and E) where the data was written, the system disk offset for each block (for de-duplication disks) and a timestamp for each block (for non de-duplication disks).

Storage of Metadata

FIGS. 10 and 11 illustrate metadata storage within platform 20. The metadata used within storage system 10 encompasses many types and includes: virtual disk information; container location information (including on which storage pools the containers are located and on which nodes); storage pool information (including which nodes have which pools and which disks); and, mutation information after write requests (where were blocks written, success and failure, etc.). As mentioned earlier, while the data associated with a particular write request may end up on three different data nodes, the metadata information associated with virtual disks, write requests, etc. will be stored using the metadata modules 130 on the computer nodes, and these nodes may be different from the nodes used for data storage.

FIG. 10 illustrates three types of information stored by a metadata module. Each of these types of information may use any suitable data structure and each type of information is independent of the others and may use a different data structure. Shown, for example, is persistent storage on node A that has been stored by its metadata module. Shown at 860 is the storage pool information for that node, showing which storage pools are present on that node and which disks are associated with each storage pool. Shown at 861 is container location information. Using the naming convention for containers discussed above, this shows that container "Vi$2" (associated with virtual disk "Vi") is located on node A and that it is part of storage pool SP3. The second listed container Vi&7 is shown as being part of the storage pool SP2. Of course, many other containers that are stored on node A may also be listed in this data structure. Shown at 862 are all of the policies and other information for the virtual disk named "Avinash." Of course, any number of other virtual disks may also have their information or metadata 864 stored on this particular node.

FIG. 11 illustrates another type of information stored by a metadata module. Shown, for example, is persistent storage on node D that has been stored by its metadata module. Shown symbolically (not to scale) at 870 is a virtual disk showing how its stored information is represented within metadata storage. In this example, assume that the virtual disk has a size of 1 TB, that each chunk portion has a size of 256 kB, assume that each block has a size of 4 kB, and that 66 blocks have been written into this virtual disk. Chunks 871 and 872 illustrate that metadata is stored on a per chunk basis.

For virtual disk 870, metadata storage region 880 is shown; write information is stored in columns 882, 884, etc., each column corresponding to a particular chunk of the virtual disk. (Other virtual disks will also have similar storage regions with their own metadata.) Column 882 represents the first chunk and also includes the version number. Column 884 represents the second chunk. In this embodiment, there will be a new column if the version is incremented and one writes again into the first chunk. In this fashion, older versions of data are never overwritten or lost, they are all saved within the storage platform for later reference if necessary.

Within each chunk column 882, are individual block columns 890, 892, etc., representing the individual blocks of that chunk that have been written to the virtual disk. For example, column 890 includes the block identifier "1," the computer nodes to which that block was written, whether not the write was a success, and a timestamp. Column 892 includes similar information for the second block. Within column 882 there will be 64 individual block columns due to the size of the blocks and the size of the chunks. Column 884 will also include the same number of block columns, for example, block column 896 identifies the block identifier "66," and the information earlier described. In this fashion, the metadata for particular virtual disk 880 is stored upon one of the computer nodes using its metadata module, and includes an identification of where each of its blocks were stored, a version, a timestamp, an identifier for each block, etc.

De-Duplication Read

Figure 12:
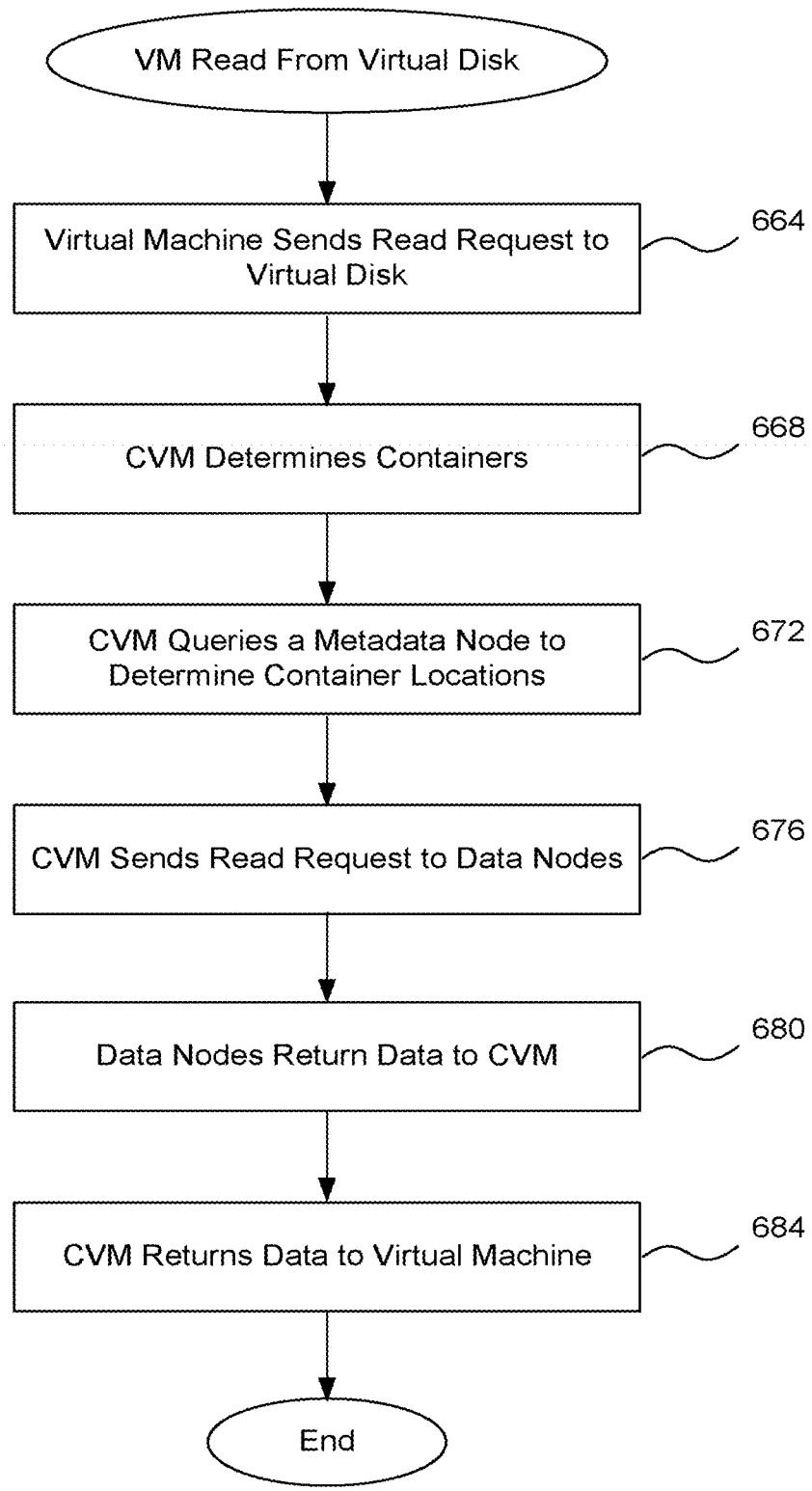
FIG. 12 is a flow diagram describing one embodiment by which a virtual machine reads data from the storage platform.

FIG. 12 is a flow diagram describing one embodiment by which a virtual machine reads data from the storage platform. In this embodiment, an application on a virtual machine is reading from a virtual disk within the platform that may or may not have de-duplication enabled.

In step 664 the virtual machine that desires to read data from the storage platform sends a read request from a particular application to the desired virtual disk. As explained above, the controller virtual machine will then trap or capture the request (depending upon whether it is a block request or an NFS request) and then place a request into its own protocol before sending the request to the storage platform.

As mentioned, a read request may originate with any of the virtual machines on computers 50-52 (for example) and may use any of a variety of storage protocols. The read request typically takes the form: read (offset, size, virtual disk name). The parameter "virtual disk name" is the name of a virtual disk on the storage platform. The parameter "offset" is an offset within the virtual disk (i.e., a value from 0 up to the size of the virtual disk), and the parameter "size" is the length of the data to be read in bytes. The CVM divides up the request into blocks; e.g., a request of size 64 k is divided up into sixteen requests of 4 k each, each request having a corresponding offset within the named virtual disk.

In addition to block cache 195, each CVM may also utilize a separate "de-duplication" cache that may be used to cache blocks for a de-duplication-enabled disk. A table such as that shown in FIG. 6 may be used to keep track of an identifier for each such block and its corresponding system disk offset. Thus, in one embodiment, the CVM first checks this de-duplication cache to determine whether any of the blocks to be read have already been written and are already present within this cache. If so, these blocks are retrieved from this block cache instead of having to establish a remote connection with storage platform 20 and retrieve those blocks remotely (which would take a greater deal of time). All blocks not found in this de-duplication cache are read from the storage nodes as described below.

Next, in step 668 the controller virtual machine determines which container or containers to read from for each block of this request based upon the offsets determined as described above, and then determines the relevant metadata nodes for this virtual disk, as shown in FIG. 13. The CVM also determines the block identifiers that it needs to read using the offset and the size from the request.

In step 672 the CVM queries a metadata node to determine on which computer nodes the data blocks identified by the block identifiers are written. Because the particular metadata nodes on which the metadata for the virtual disk is stored had been previously cached by the CVM, the CVM can easily select one of these metadata nodes to query. The CVM sends a query with a container identifier (e.g., C2) and requests the return of a list of the actual computer nodes on which the data had been written. The metadata node knows which data nodes to return because it had previously stored that information in step 420; see, for example, FIG. 11. For data block 1, for example, metadata region 880 indicates that the block is stored on data nodes A, B and C, and that a system disk offset for that data block is found in field 888. Virtual disks with de-duplication enabled will have a system disk offset stored in field 888; those with de-duplication not enabled will have a timestamp stored in column 890, rather than a system disk offset. Once the metadata node retrieves the data nodes where the data blocks are stored, along with a system disk offset for each block (or a timestamp for non-enabled virtual disks) it then returns this information to the CVM. The CVM is now ready to perform the read request.

In step 676 the CVM then sends the read request to each of the data nodes returned in the previous step. The read request includes a list of block identifiers to be read, the system disk offset for each block (for a de-duplication-enabled virtual disk), and a timestamp (for a non de-duplication-enabled virtual disk).

In one situation involving a read from the system disk on behalf of a virtual disk with de-duplication enabled, it is possible that some of the blocks to be read may be the same (e.g., they are all entirely zeros). In this situation, all of the system disk offsets for these blocks will all point to the same block on disk. It is only necessary to perform a single read for all of these system disk offsets in order to obtain the single block.

In step 680 each data node returns the data identified by the block identifiers to the CVM. In step 684 the CVM then returns this data to the requesting virtual machine using the appropriate protocol, again masquerading either as a block device or as an NFS device depending upon the protocol used by the particular application.

Alternatively, the read request is sent to only one of the data nodes (e.g., B) and also includes an indication of the other two data nodes (D, E) from which the data should be read. The first data node then passes the read request to each of the other data nodes. Each of these data nodes that receives the request then reads the data from its disk drives. Once each of these nodes reads the data from its disk drives, each of these nodes returns the data back to the first data node that had originally received the request from the CVM. This first data node then returns the data to the CVM.

FIG. 13 shows information that may be stored within memory cache 181 of a controller virtual machine (CVM) 180 on one of the computer servers. Preferably, all information concerning a particular virtual disk attached to a CVM will be organized into a virtual disk object and then stored into the memory cache. A hash table is used to store these virtual disk objects and the key to find each object is the name of the virtual disk. Stored within this cache is the generation number 846, virtual disk information 260 and metadata nodes 898 indicating on which nodes the metadata for this virtual disk is stored.

Computer System Embodiment

Figure 14:
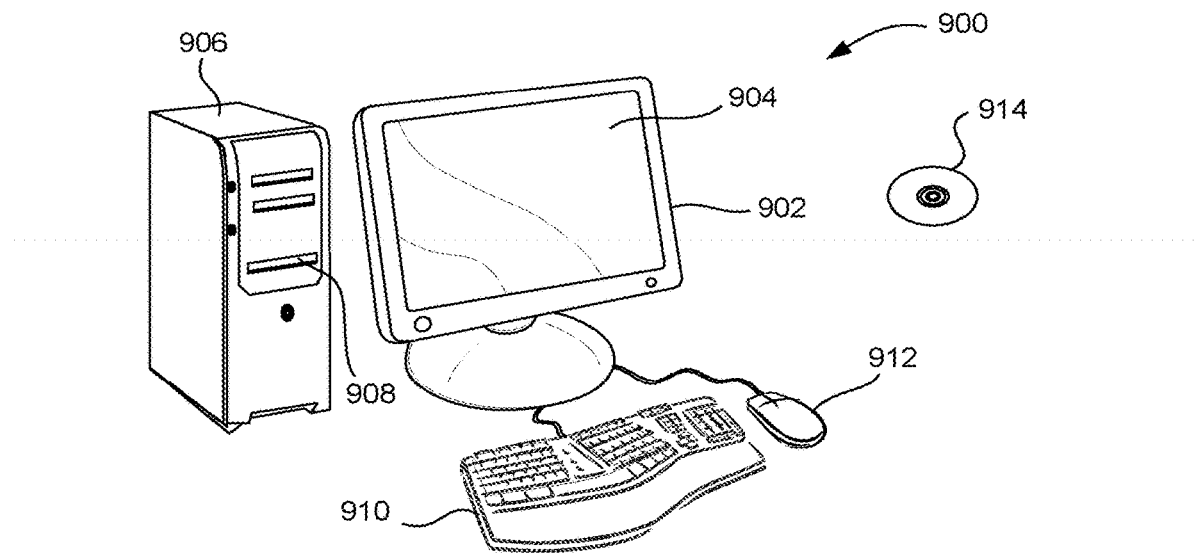
FIGS. 14 and 15 illustrate a computer system suitable for implementing embodiments of the present invention.
Figure 15:
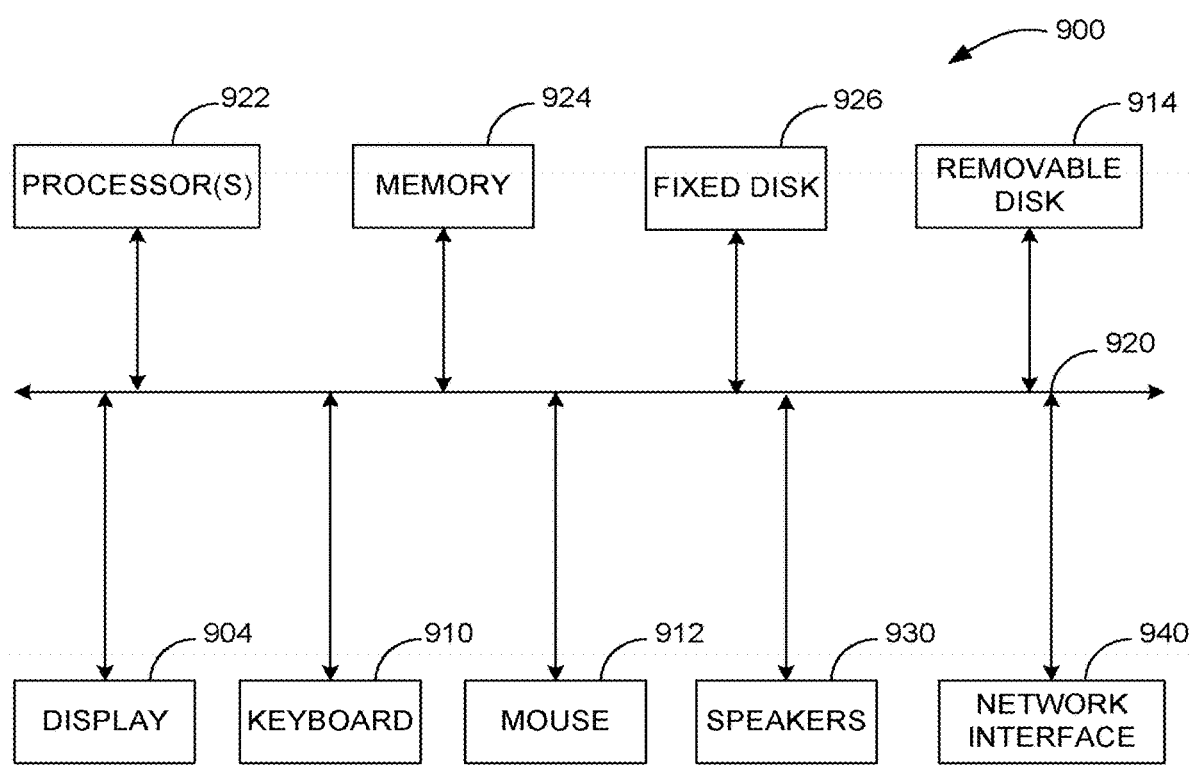

FIGS. 14 and 15 illustrate a computer system 900 suitable for implementing embodiments of the present invention. FIG. 14 shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 15 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A system comprising:
a data storage platform in communication with a computer server, wherein the data storage platform comprises computer nodes, and wherein each computer node comprises a computer and storage devices; and
the computer server, which is configured to execute a controller virtual machine, which is configured to intercept write requests issued by software applications hosted by the computer server, and wherein each write request is addressed to one of a plurality of virtual disks configured on the data storage platform;
wherein a system deduplication virtual disk, which is distinct from the plurality of virtual disks, is configured on the data storage platform, is partitioned across some of the computer nodes, and is not accessible as a storage target to the software applications hosted by the computer server;
wherein the controller virtual machine executing at the computer server is configured to:
receive from a software application executing at the computer server, a write request to write data onto a first virtual disk among the plurality of virtual disks at the data storage platform, wherein the first virtual disk is configured with deduplication enabled,
calculate a hash value for each block within the data in the write request,
determine whether each hash value is present in a table that includes hash values of blocks that have been written to the system deduplication virtual disk in the data storage platform,
based on the controller virtual machine determining that the table comprises a first hash value calculated for a first block within the data in the write request, (i) retrieve from the table a first offset indicating where a given block having the first hash value is stored in the system deduplication virtual disk, and (ii) write an identifier of the given block and the first offset to metadata in the data storage platform, wherein the metadata is associated with the first virtual disk, wherein the first block is not written to the first virtual disk indicated in the write request,
based on the controller virtual machine determining that the table does not comprise a second hash value calculated for a second block within the data in the write request, (iii) write the second block to the system deduplication virtual disk at a second offset, and (iv) write an identifier of the second block and the second offset to metadata in the data storage platform associated with the first virtual disk, wherein the second block is not written to the first virtual disk indicated in the write request; and
wherein the controller virtual machine executing at the computer server is further configured to: determine whether each hash value is present in the table only if the first virtual disk is configured with deduplication enabled.

2. The system of claim 1, wherein the system deduplication virtual disk stores blocks for all virtual disks among the plurality of virtual disks at the data storage platform that are configured with deduplication enabled.

3. The system of claim 1, wherein the table that includes hash values of blocks that have been written to the system deduplication virtual disk in the data storage platform is stored at and maintained by a metadata module of each computer node.

4. The system of claim 3, wherein at least part of the table that includes hash values of blocks that have been written to the system deduplication virtual disk in the data storage platform is additionally stored at a cache of the controller virtual machine.

5. The system of claim 1, wherein the table that includes hash values of blocks that have been written to the system deduplication virtual disk in the data storage platform is stored at and maintained by a metadata module of each computer node;
wherein part of the table is additionally stored at a cache of the controller virtual machine; and
wherein when the controller virtual machine determines that the part of the table does not comprise a given hash value, the controller virtual machine is further configured to contact a metadata module at a computer node to determine whether the table at the metadata module comprises the given hash value.

6. The system of claim 1, wherein the table that includes hash values of blocks that have been written to the system deduplication virtual disk in the data storage platform is stored at and maintained by a metadata module of each computer node;
  wherein the table is additionally stored at a cache associated with the controller virtual machine at the computer server; and
  wherein to determine whether the table comprises a given hash value, the controller virtual machine checks the table stored at the cache associated with the controller virtual machine.

7. The system of claim 1, wherein blocks are written sequentially to the system deduplication virtual disk.

8. The system of claim 1, wherein blocks are written sequentially to the system deduplication virtual disk; and
  wherein the controller virtual machine periodically requests, from the data storage platform, information about next available offsets available in the system deduplication virtual disk.

9. The system of claim 1, wherein blocks are written sequentially to the system deduplication virtual disk; and
  wherein the controller virtual machine periodically requests, from the data storage platform, information about next available offsets available in the system deduplication virtual disk, and wherein the information is available from one or more metadata modules of the data storage platform.

10. The system of claim 1, wherein write operations do not overwrite older versions of blocks, and wherein data is stored at the data storage platform in chunks, each chunk having a name that identifies a version of the data in the chunk.

11. The system of claim 1, wherein the controller virtual machine is further configured to:
  receive from a software application executing at the computer server, a read request to read a third block from a third offset of the first virtual disk at the data storage platform, which is configured with deduplication enabled,
  determine a storage container representing a partition of the system deduplication virtual disk comprising a data block corresponding to the third offset of the first virtual disk,
  determine a computer node hosting the storage container,
  read the data block from the storage container at the computer node hosting the storage container, and
  return the data block read from the storage container to the software application that issued the read request at the computer server.

12. The system of claim 1, wherein the controller virtual machine is further configured to:
  receive from a software application executing at the computer server, a read request to read a third block from a third offset of the first virtual disk at the data storage platform, which is configured with deduplication enabled,
  based on determining that a cache at the computer server comprises the third block, wherein the cache is associated with the controller virtual machine, return the third block read from the cache to the software application that issued the read request at the computer server.

13. A computer-implemented method comprising:
by a controller virtual machine that is hosted by a computer server, which is distinct from computer nodes of a data storage platform, intercepting write requests issued by software applications hosted by the computer server,
  wherein each of the computer nodes comprises a computer and storage devices,
  wherein each write request is addressed to one of a plurality of virtual disks configured on the data storage platform,
  wherein a system deduplication virtual disk, which is configured on the data storage platform, is partitioned across some of the computer nodes, and is not accessible as a storage target to the software applications hosted by the computer server;
by the controller virtual machine:
  receiving from a software application executing at the computer server, a write request to write data onto a first virtual disk among the plurality of virtual disks at the data storage platform, wherein the first virtual disk is provisioned with deduplication enabled,
  calculating a hash value for each block within the data in the write request, and
  determining whether each hash value is present in a table that includes hash values of blocks that have been written to the system deduplication virtual disk in the data storage platform;
based on the controller virtual machine determining that the table comprises a first hash value calculated for a first block within the data in the write request, (i) retrieving from the table a first offset indicating where a data block having the first hash value is stored in the system deduplication virtual disk, and (ii) writing an identifier of the data block and the first offset to metadata in the data storage platform that is associated with the first virtual disk, wherein the first block is not written to the first virtual disk indicated in the write request;
based on the controller virtual machine determining that the table does not comprise a second hash value calculated for a second block within the data in the write request, (iii) writing the second block to the system deduplication virtual disk at a second offset, and (iv) writing an identifier of the second block and the second offset to metadata in the data storage platform associated with the first virtual disk, wherein the second block is not written to the first virtual disk indicated in the write request; and
determining whether each hash value is present in the table only if the first virtual disk is provisioned with deduplication enabled.

14. The method of claim 13, wherein the system deduplication virtual disk stores blocks for all virtual disks among the plurality of virtual disks at the data storage platform that are provisioned with deduplication enabled.

15. The method of claim 13, wherein the table that includes hash values of blocks that have been written to the system deduplication virtual disk in the data storage platform is stored at and maintained by a metadata module of one or more of the computer nodes.

16. The method of claim 15, wherein at least part of the table that includes hash values of blocks that have been written to the system deduplication virtual disk in the data storage platform is additionally stored at a cache of the controller virtual machine.

17. The method of claim 13, wherein the table that includes hash values of blocks that have been written to the system deduplication virtual disk in the data storage platform is stored at and maintained by a metadata module of one or more of the computer nodes;
- wherein part of the table is additionally stored at a cache of the controller virtual machine; and
- wherein when the controller virtual machine determines that the part of the table does not comprise a given hash value, the controller virtual machine contacts a metadata module to determine whether the table at the metadata module comprises the given hash value.

18. The method of claim 13, wherein the table that includes hash values of blocks that have been written to the system deduplication virtual disk in the data storage platform is stored at and maintained by a metadata module of one or more of the computer nodes;
- wherein the table is additionally stored at a cache of the controller virtual machine; and
- wherein to determine whether the table comprises a given hash value, the controller virtual machine checks the table stored at the cache of the controller virtual machine.

19. The method of claim 13 further comprising:
by the controller virtual machine:
receiving from a software application executing at the computer server, a read request to read a third block from a third offset of the first virtual disk at the data storage platform, which is configured with deduplication enabled,
determining a storage container representing a partition of the system deduplication virtual disk comprising a data block corresponding to the third offset of the first virtual disk,
determining a computer node hosting the storage container,
reading the data block from the storage container at the computer node hosting the storage container, and
returning the data block read from the storage container to the software application that issued the read request for the third block at the computer server.

20. The method of claim 13 further comprising:
by the controller virtual machine:
receiving from a software application executing at the computer server, a read request to read a third block from a third offset of the first virtual disk at the data storage platform, which is configured with deduplication enabled, and
determining that a cache at the computer server comprises the third block, wherein the cache is associated with the controller virtual machine, and
without communicating further with the data storage platform, returning the third block read from the cache to the software application that issued the read request for the third block at the computer server.

* * * * *